US009632959B2

(12) United States Patent
Bouley

(10) Patent No.: US 9,632,959 B2
(45) Date of Patent: Apr. 25, 2017

(54) EFFICIENT SEARCH KEY PROCESSING METHOD

(71) Applicant: Netronome Systems, Inc., Santa Clara, CA (US)

(72) Inventor: Rick Bouley, Maynard, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 353 days.

(21) Appl. No.: 14/326,388

(22) Filed: Jul. 8, 2014

(65) Prior Publication Data

US 2016/0012148 A1    Jan. 14, 2016

(51) Int. Cl.
*G06F 13/28* (2006.01)
*G06F 13/16* (2006.01)

(52) U.S. Cl.
CPC .......... *G06F 13/28* (2013.01); *G06F 13/1663* (2013.01)

(58) Field of Classification Search
CPC ........... G06F 17/30952; G06F 7/30864; G06F 13/28; G06F 13/1663; G06F 13/4221; G06F 12/1081
See application file for complete search history.

(56) References Cited

U.S. PATENT DOCUMENTS

| 2016/0011987 A1* | 1/2016 | Bouley | ............... G06F 12/1081 710/308 |
| 2016/0011994 A1* | 1/2016 | Bouley | .................. G06F 13/28 710/308 |
| 2016/0011995 A1* | 1/2016 | Bouley | ............... G06F 13/4221 710/308 |
| 2016/0105363 A1* | 4/2016 | Westlund | ................ G06F 13/18 711/108 |

* cited by examiner

*Primary Examiner* — Glenn A Auve
(74) *Attorney, Agent, or Firm* — Imperium Patent Works LLP; T Lester Wallace; Mark D. Marrello

(57) ABSTRACT

An efficient search key processing method includes writing a first and a second search key data set to a memory, where the search key data sets are written to memory on a word by word basis. Each of the first and second search key data sets includes a header indicating a common lookup operation to be performed and a string of search keys. The header is immediately followed in memory by a search key. The search keys are located contiguously in the memory. At least one word contains search keys from the first and second search key data sets. The memory is read word by word. A first plurality of lookup command messages are sent based on the search keys included in the first search key data set. A second plurality of lookup command messages are sent based on the search keys included in the second search key data set.

13 Claims, 20 Drawing Sheets

SEARCH KEY FORMATTER

MULTI-PROCESSOR CIRCUIT WITH DMA CONTROLLED
INTERLAKEN LOOK ASIDE INTERFACE CIRCUIT ON-BOARD

DMA CONTROLLED INTERLAKEN LOOK ASIDE CIRCUIT
WITH STANDARD BUS INTERFACE CIRCUIT AND
MEMORY INTERFACE CIRCUIT

ISLAND BASED NETWORK FLOW PROCESSOR WITH DMA CONTROLLED
INTERLAKEN LOOK ASIDE INTERFACE CIRCUIT ON-BOARD

DMA CONTROLLED INTERLAKEN LOOK ASIDE CIRCUIT WITH INTERNAL MEMORY, STANDARD BUS INTERFACE CIRCUIT AND EVENT BUS INTERFACE CIRCUIT

DMA CONTROLLER

SEARCH KEY FORMATTER

SINGLE SEARCH KEY FORMATTER AND
TX_DATA_STORE LOGIC

SKDS = SEARCH KEY DATA SET
SK = SEARCH KEY

SEARCH KEY DATA SETS STORED IN MEMORY

HEADER DATA FORMAT

METHOD OF COMMUNICATING MULTIPLE
SEARCH KEYS VIA DIRECT MEMORY ACCESS

METHOD OF COMMUNICATING MULTIPLE
SEARCH KEYS VIA DIRECT MEMORY ACCESS

STATE MACHINE FLOWCHART

STATE MACHINE FLOWCHART

| INPUTS | | | | | | | | | OUTPUTS | | | | |
|---|---|---|---|---|---|---|---|---|---|---|---|---|---|
| STATE | EXTRA | POP_D | VLD_CNT | KEY_SZE | WD[255:192] | WD[191:128] | WD[127:64] | WD[63:00] | DS[95:64] | DS[63:32] | DS[31:0] |
| HDR_TOP | X | 1 | X | 0 | {RD[63:32], RD[95:64]} | {RD[127:96],00} | WD[127:64] | WD[63:00] | DS[95:64] | DS[63:32] | DS[31:0] |
| HDR_TOP | X | 1 | X | !=0 | WD[255:192] | WD[191:128] | WD[127:64] | WD[63:00] | RD[63:32] | RD[95:64] | RD[127:96] |
| HDR_BOT | X | 1 | X | X | {DS[31:00], RD[31:00]} | {RD[63:32], RD[95:64]} | {RD[127:96], WD[95:64]} | WD[63:00] | DS[95:64] | DS[63:32] | DS[31:00] |
| KEY_TOP | X | 1 | 0 | X | DS[95:32] | {DS[31:00], RD[31:00]} | {RD[63:32], RD[95:64]} | {RD[127:96],00} | DS[95:64] | DS[63:32] | DS[31:00] |
| KEY_TOP | X | 1 | 1 | X | WD[255:192] | WD[191:128] | WD[127:64] | {WD[63:32], RD[31:00]} | RD[63:32] | RD[95:64] | RD[127:96] |
| KEY_TOP | 1 | 0 | X | X | DS[95:32] | {DS[159:128]} | WD[127:64] | WD[63:00] | 0 | 0 | 0 |
| KEY_BOT | X | 1 | 0 | X | WD[255:192] | WD[191:128] | {WD[127:96], RD[31:00]} | {RD[63:32], WD[95:64]} | DS[95:64] | DS[63:32] | RD[127:96] |
| KEY_BOT | X | 1 | 1 | X | {DS[31:00], RD[31:00]} | {RD[63:32], RD[95:64]} | {RD[127:96], WD[95:64]} | WD[63:00] | 0 | 0 | 0 |
| START_BOT | X | X | X | X | WD[255:192] | WD[191:128] | WD[127:64] | WD[63:00] | DS[95:64] | DS[63:32] | RD_D[127:96] |

IN ALL OTHER CASES WD=WD AND DS=DS

KEY
WE=DATA_FIFO_WRITE_ENABLE
DS = TX_DATA_STORE[95:0]
RD = READ_DATA[127:0]
RD_D = registered version of RD
WD = WRITE_DATA[255:0]
POP_D = Registered version of POP
VLD_CNT = 1-bit Counter that increments in KEY_TOP or KEY_BOT when POP_D ==1.

STATE TABLE FOR THE GENERATION OF
WR_DATA[255:0] AND DATA_STORE[95:0]

FIG. 12

| | INPUTS | | | | | OUTPUT |
|---|---|---|---|---|---|---|
| STATE | EXTRA | POP_D | VLD_CNT | KEY_CNT | KEY_SIZE | WE |
| HDR_TOP | X | 1 | X | X | 0 | 1 |
| HDR_BOT | X | 1 | X | X | 0, 1 | 1 |
| KEY_TOP | X | 1 | 0 | X | 1 | 1 |
| KEY_TOP | X | 1 | 1 | X | 3,4,5,6,7 | 1 |
| KEY_TOP | 1 | X | X | X | 3,4,5,6,7 | 1 |
| KEY_BOT | X | 1 | X | X | 2 | 1 |
| KEY_BOT | X | 1 | 0 | X | 3,4,5,6,7 | 1 |
| KEY_BOT | X | 1 | 1 | 0 | 3,4,5,6,7 | 1 |

IN ALL OTHER CASES WE = 0.

KEY
WE=DATA_FIFO_WRITE_ENABLE
DS = TX_DATA_STORE[96:0]
RD = READ_DATA[127:0]
RD_D = REGISTERED VERSION OF RD
WD = WRITE_DATA[255:0]
POP_D = REGISTERED VERSION OF POP
VLD_CNT = 1-BIT COUNTER THAT INCREMENTS IN KEY_TOP OR KEY_BOT WHEN POP_D ==1.

STATE TABLE FOR THE GENERATION OF
DATA_FIFO_WRITE_ENABLE

FIG. 13

MPLS ROUTER

TRANSFERRED OVER MINIPACKET BUS

ME ISLAND

INTERLAKEN ISLAND

MAC ISLAND
(EGRESS)

EFFICIENT SEARCH KEY PROCESSING METHOD

TECHNICAL FIELD

The described embodiments relate generally to the efficient communication and processing of search keys. More specifically, the embodiments relate to efficiently processing search keys utilizing a direct memory access controlled Interlaken look-aside interface.

BACKGROUND INFORMATION

In a packet processing system efficient processing of search keys during lookup operations is paramount. For example, in a multi-processor packet processing device multiple processors may share a single bus that is utilized to communicate multiple search keys. Inefficient communication of the multiple search keys from multiple processors can quickly degrade the performance of the shared bus.

SUMMARY

In a first novel aspect, a device includes a shared memory that stores a search key data set, a processor that generates a descriptor, a Direct Memory Access (DMA) controller, and an Interlaken Look Aside (ILA) interface circuit. The search key data set includes a plurality of search keys. The Direct Memory Access (DMA) controller (i) receives the descriptor from the processor via a bus, (ii) in response to receiving the descriptor value generates a search key data request and sends the search key data request to the shared memory via the bus, (iii) receives the search key data set from the shared memory via the bus, (iv) selects a first search key from the search key data set, (v) generates ILA packet header information, and (vi) outputs the first search key and the ILA packet header information. The Interlaken Look Aside (ILA) interface circuit that receives the first search key and the ILA packet header information from the DMA controller and supplies an ILA packet to an external transactional memory device across an ILA bus. The ILA packet includes the ILA packet header information and the first search key.

In an example, the descriptor includes: 1) a length of a DMA operation, 2) a read address where the search key data set is stored in the shared memory, 3) a write address where a result data value will be written, and 4) completion notification information.

In a second novel aspect, a Direct Memory Access (DMA) controller: (a) receives a descriptor from a processor to the DMA controller via a bus, (b) generates a search key data request, (c) writes the search key data request to a shared memory via the bus, (d) receives a search key data set from the shared memory in response to (c), (e) selects a first search key from the plurality of search keys, (f) generates a first Interlaken Look Aside (ILA) packet including the first search key, and (g) outputs the first ILA packet to an external transactional memory device via an ILA bus. The DMA controller includes a local memory. The search key request is a function of the descriptor. The search key data set includes a plurality of search keys and header data. The selection of the first search key is a function of a key size. The key size is included in the header data.

In an example, the devices also (h) receives a second ILA packet from the external transaction memory device via the ILA bus, (i) writes result data value to the local memory, (j) generates a DMA completion message indicating that a DMA operation initiated by the descriptor is complete, and (k) communicates the DMA completion message to the processor. The second ILA packet includes a result data value.

In a third novel aspect, a device includes a standard bus interface port, a memory interface port, an Interlaken Look Aside (ILA) interface port, a Standard Bus Interface Circuit (SBIC), a memory interface circuit, a Direct Memory Access (DMA) controller, and an ILA interface circuit. The Standard Bus Interface Circuit (SBIC) receives a descriptor and a search key data set onto the apparatus via the standard bus interface port. The search key data set includes a plurality of search keys. The memory interface circuit receives the search key data set from the SBIC and writes the search key data set to an external memory via the memory interface port. The Direct Memory Access (DMA) controller: (i) receives the descriptor from the SBIC, (ii) generates a search key data request in response to receiving the descriptor, (iii) receives the search key data set from the external memory via the memory interface circuit and the memory interface port, (iv) selects a first search key from the search key data set, and (v) outputs the first search key. The ILA interface circuit receives the first search key from the DMA controller and supplies an ILA packet to an external transactional memory device via the ILA interface port. The ILA packet includes the first search key.

In an example, the device is a packaged integrated circuit, and the SBIC is a bus interface taken from the group consisting of: a Peripheral Component Interconnect Express (PCIe) bus interface, and Universal Serial Bus (USB) bus interface, and an Advanced Microcontroller Bus (AMBA) bus interface.

In a fourth novel aspect, a Direct Memory Access (DMA) controller: (a) receives a descriptor from a processor to the DMA controller via a standard bus interface, (b) generates a search key data request, (c) writes the search key data request to an external memory via the a memory interface circuit, (d) receives a search key data set from the external memory via the memory interface circuit in response to (c), (e) selects a first search key from the plurality of search keys, (f) generates a first Interlaken Look Aside (ILA) packet including the first search key, and (g) outputs the first ILA packet to an external transactional memory device via an ILA port. The DMA controller comprises a local memory. The search key request is a function of the descriptor. The search key data set includes a plurality of search keys and header data. The selection of the first search key is a function of a key size and the key size is included in the header data.

In a fifth novel aspect, Island-Based Network Flow Processor (IBNFP) integrated circuit includes a bus, a first island, a second island, and a third island. The first island includes a memory and a processor. The second island includes a Direct Memory Access (DMA) controller. The third island includes an Interlaken Look Aside (ILA) interface circuit and an interface circuit. The processor writes a search key data set into the memory. The search key data set includes a plurality of search keys. The Direct Memory Access (DMA) controller: (i) receives the descriptor from the processor in the first island via the bus, (ii) generates a search key data request in response to receiving the descriptor and communicates the search key data request to the memory in the first island via the bus, (iii) receives the search key data set from the memory in the first island via the bus, (iv) selects a first search key from the search key data set, (v) generates header information, and (vi) outputs the first search key and the header information. The Interlaken Look Aside (ILA) interface circuit receives the first search key and the header information from the DMA controller and outputs an ILA packet. The interface circuit receives the ILA packet from the ILA interface circuit and outputs the ILA packet from the IBNFP integrated circuit to an external transactional memory device.

In a sixth novel aspect, a device: (a) writes a search key data set onto a memory via a bus, (b) receives a descriptor from a processor onto a DMA controller via a bus, (c) generates a search key data request, wherein the search key request is a function of the descriptor, (d) writes the search key data request to the memory via the bus, (e) receives a search key data set from the memory via the bus in response to (d), (f) selects a first search key from the plurality of search keys, (g) generates a first Interlaken Look Aside (ILA) packet including the first search key; and (h) outputs the first ILA packet to an external transactional memory device via an ILA bus. The DMA controller comprises a local memory. The search key data set includes a plurality of search keys and header data. The selection of the first search key is a function of a key size and the key size is included in the header data. The processor and the memory are located on a first island. The DMA controller is located on a second island.

In a seventh novel aspect, a device: (a) writes a first search key data set and a second search key data set into a memory, (b) reads the memory word by word and thereby reading the first search key data set and the second search key data set, (c) outputs a first plurality of lookup command messages, and (d) outputs a second plurality of lookup command messages. The memory is written with search key data sets only on a word by word basis. Each of the first and second search key data sets includes a header along with a string of search keys. The header of a search key data set indicates a common lookup operation to be performed using each of the search keys of the search key data set. The header of a search key data set is immediately followed in memory by a search key of the search key data set. The search keys of the search key data set are located contiguously in the memory. At least one word contains search keys from both the first and second search key data sets. Each respective one of the first plurality of lookup command messages includes a corresponding respective one of the search keys of the first search key data set. Each respective one of the second plurality of lookup command messages includes a corresponding respective one of the search keys of the second search key data set.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 12 is a state table illustrating how WR_DATA[255:0] and DATA_STORE[95:0] are generated.

FIG. 13 is a state table illustrating how DATA_FIFO_WRITE_ENABLE is generated.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
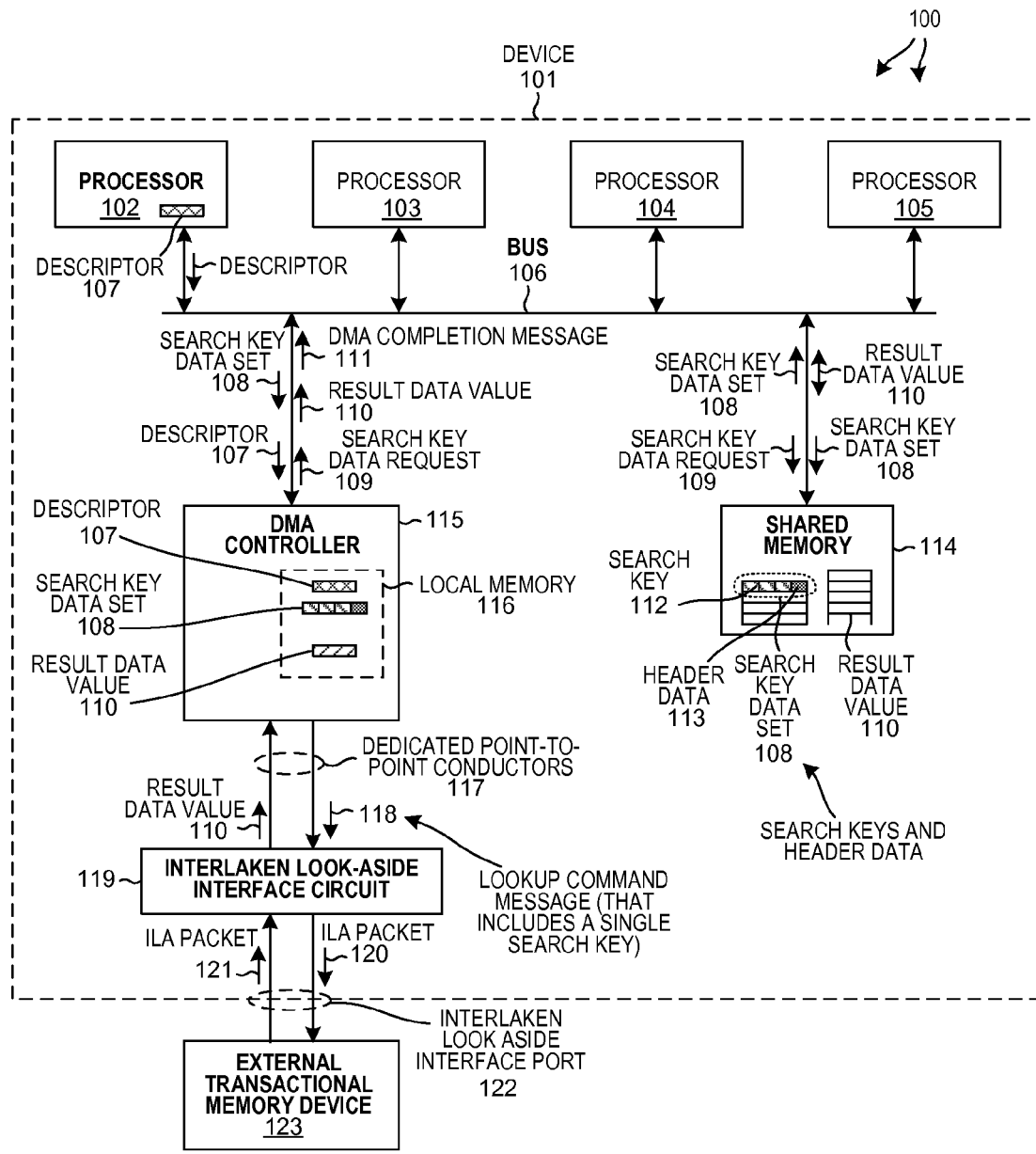
FIG. 1 is a simplified diagram of a multi-processor circuit with Direct Memory Access (DMA) controlled Interlaken look-aside interface circuit on-board.
Figure 8:
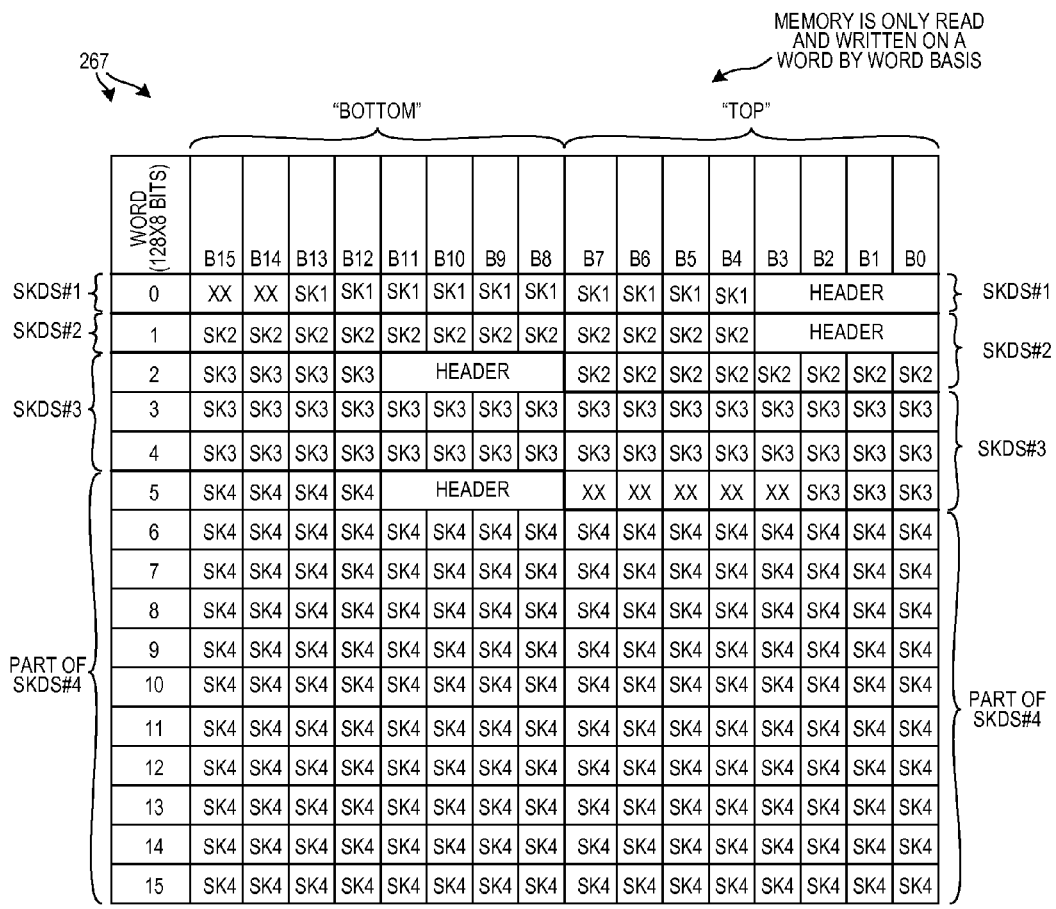
FIG. 8 is a diagram illustrating a method of storing search key data sets in memory.

FIG. 1 is a simplified diagram of a multi-processor circuit with Direct Memory Access (DMA) controlled Interlaken look-aside interface circuit on-board. System 100 includes device 101 and external transactional memory device 123. Device 101 is multi-processor circuit with DMA controlled Interlaken look-aside interface circuit on-board. Device 101 includes a plurality of processors 102-105. Each of the plurality of processors communicate with bus 106. Bus 106 may be a standard bus such as PCIe or AMBA, or Bus 106 may be a unique non-standard bus. Device 101 also includes DMA controller 115, shared memory 114, and Interlaken Look-Aside (ILA) interface circuit 119. The DMA controller 115 includes a local memory 116 that stores descriptors, search key data sets, and a result data values. Shared memory 114 also stores search key data sets and result data values. In operation, a search key data set 108 is stored in shared memory 114. In one example, processor 102 causes the search key data set 108 to be stored in shared memory 114. In another example, another processor causes search key data set 108 to be stored in shared memory 114. In the event that a processor 102 needs to access the external transactional memory device 123, processor 102 generates a descriptor 107 and sends the descriptor 107 to DMA controller 115 via bus 106. Descriptor 106 includes: (i) the length of the DMA operation in bytes, (ii) a read address from which to a fetch search key data set, and (iii) a write address to which result data values are to be written, and (iv) completion notification information. In response to receiving descriptor 107, DMA controller 115 stores the descriptor 107 in local memory 116, generates a search key data request 109, and sends the search key data request 109 to shared memory 114 via bus 106. The search key data request 109 is a function of the length of the DMA operation and the read address included in the descriptor 107. In response to receiving the search key data request 109, the shared memory 114 sends search key data set 108 to the DMA controller 115 via bus 106. The search key data set includes header data 112 and multiple search keys (including search key 112). An example of multiple search key data sets is illustrated in FIG. 8. In response to receiving the search key data set 108, DMA controller 115 parses the header data 113 to identify a key size included in the header data 113. The key size is used to delineate the multiple search keys included in the search key data set 108. The DMA controller 115 then generates one lookup command message for each individual search key. The DMA controller 115 then communicates one lookup command message 118 at a time to Interlaken look-aside interface circuit 119 via dedicated point-to-point conductors 117. In response to receiving a lookup command message 118, Interlaken look-aside interface circuit 119 generates an Interlaken look-aside packed 120 including the single search key. Interlaken look-aside interface circuit sends the ILA packet 120 to the external transactional memory device 123 via Interlaken look-aside interface port 122. In response to receiving the ILA packet 120, the external transactional memory device 123 selects a result data value 110, generates an ILA packet 121 including the result data value 110, and sends the ILA packet 121 to Interlaken look-aside interface circuit 119 via Interlaken look-aside interface port 122. The Interlaken look-aside interface circuit reads the result data value 110 from the ILA packet 121 and communicates the result data value 110 to the DMA controller 115 via dedicated point-to-point conductors 117. In response to receiving the result data value 110, the DMA controller 115 stores the result data value 110 in local memory 116. The DMA controller repeats this process until all the search keys included in the search key data set 108 have been communicated to the external transactional memory device 123 and all resulting result data values have been received by the DMA controller 115 and stored in local memory 116. Once the DMA controller 115 has completed the processing of all the search keys included in the search key data set 108, the DMA controller 115 writes all the result data values stored in local memory 116 to shared memory 114 at the write address included in the descriptor 107. The DMA controller 115 also generates a DMA completion message 111 and sends the DMA completion message 111 to the processor 102 that was the source of descriptor 107. The DMA completion message includes the completion notification information included in the descriptor 107 and serves to provide notification to processor 102 that the accessing of the external transaction memory device 123 is completed. In response to receiving the DMA completion message, the processor 102 reads the result data value 110 (and all other result data values stored in shared memory 114 as a result of processing descriptor 107) from the shared memory 114 via bus 106.

In a first effort to minimize the number of cycles the bus 106 is utilized to perform the bus communications described above, the search key data set 108 is communicated in chucks, wherein each chunk of search key data set 108 is the same number of bits as the bus 106 is wide. That is, if bus 106 is one hundred and twenty-eight bits wide then the shared memory 114 will communicate the search key data set 108 to the DMA controller 115 one hundred and twenty-eight bits at a time across bus 106. Therefore, if the search key data set 108 is one hundred and twenty-eight bits or less, then the entire search key data set 108 will communicated to DMA controller 115 in a single bus transaction. If the search key data set 108 is two hundred and fifty-six bits or less, then the entire search key data set 108 will communicated to DMA controller 115 in only two bus transactions. The detailed operation of the DMA controller 115 is discussed below with respect to more detailed diagrams shown in FIGS. 5-7.

In a second effort to minimize the number of cycles the bus 106 is utilized to perform the bus communications described above, the result data values are communicated in chucks, wherein each chunk of result data values is the same number of bits as the bus 106 is wide. That is, if bus 106 is one hundred and twenty-eight bits wide then the DMA controller 115 and the shared memory 114 will communicate the result data values one hundred and twenty-eight bits at a time across bus 106. Therefore, if the sum of all result data values is one hundred and twenty-eight bits or less, then the all the result data values will be communicated in a single bus transaction. If the sum of all the result data values is two hundred and fifty-six bits or less, then all the result data values will be communicated in only two bus transactions.

Figure 2:
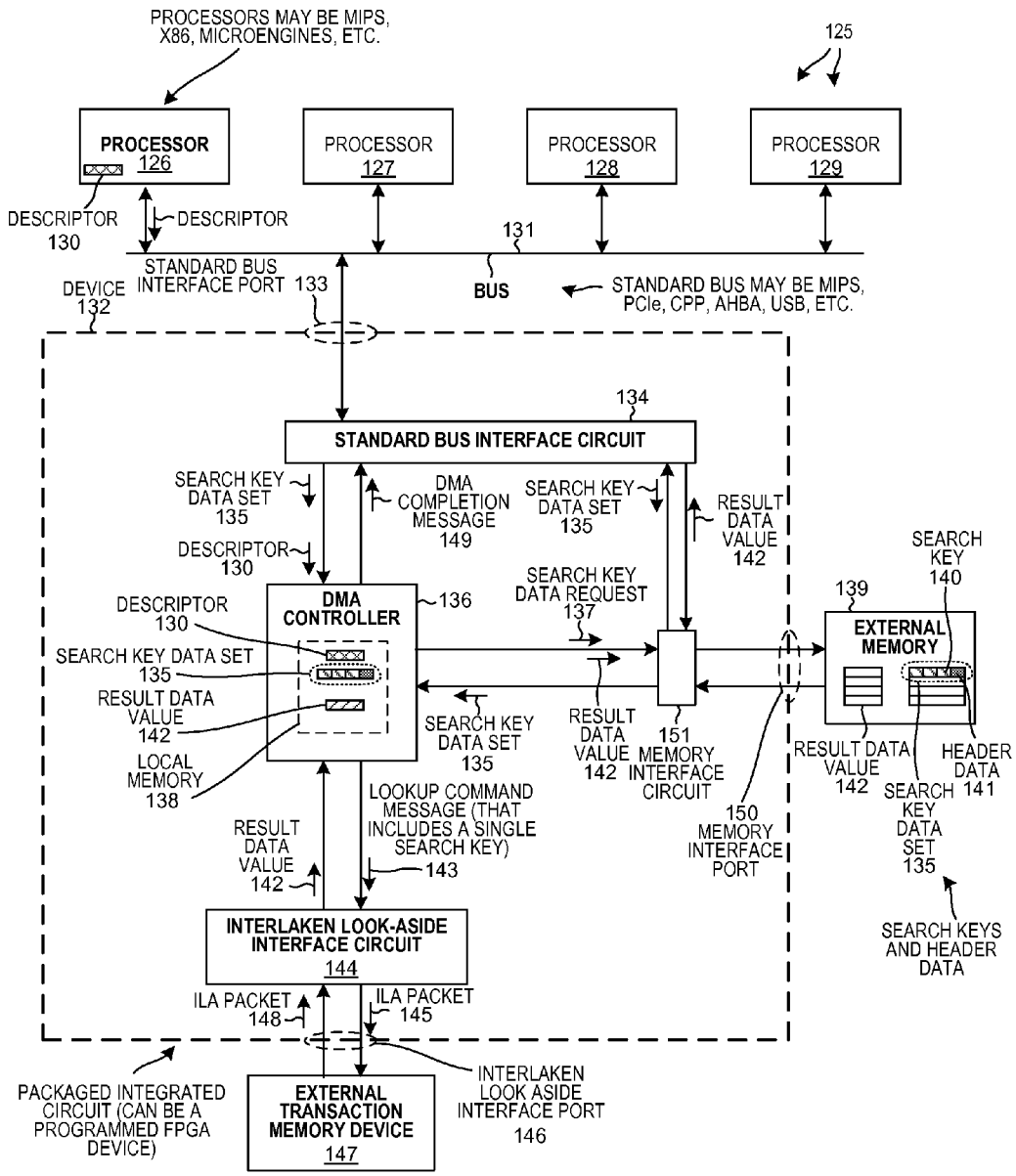
FIG. 2 is a simplified diagram of a DMA controlled Interlaken look-aside circuit with a standard bus interface circuit and a memory interface circuit.

FIG. 2 is a simplified diagram of a DMA controlled Interlaken look-aside circuit with a standard bus interface circuit and a memory interface circuit. System 125 includes processors 126-129, bus 131, device 132, external memory 139, and external transactional memory device 147. Device 132 is a DMA controlled Interlaken look-aside circuit with a standard bus interface circuit 134 and a memory interface circuit 151. Processors 126-129 and device 132 communicate with bus 106. Bus 106 is a standard bus such as a Peripheral Component Interconnect Express (PCIe) bus interface, and Universal Serial Bus (USB) bus interface, or an Advanced Microcontroller Bus (AMBA) bus interface. Device 132 includes DMA controller 136, standard bus interface circuit 134, memory interface circuit 151, and Interlaken Look-Aside (ILA) interface circuit 144. Device 132 also includes three ports: (i) a standard bus interface port 133, (ii) a memory interface port 150, and (iii) a Interlaken look-aside interface port 146. The DMA controller 136 includes a local memory 138 that stores descriptors, search key data sets, and a result data values. External memory 139 also stores search key data sets and result data values. In operation, a search key data set 135 is stored in external memory 139. In one example, processor 126 causes the search key data set 135 to be stored in external memory 139. In another example, another processor causes search key data set 135 to be stored in external memory 139. Regardless of the programming processor, the search key data set 135 is communicated to external memory 139 by first being communicated to the standard bus interface circuit 134 via bus 131 and then communicated from the standard bus interface circuit 134 to the external memory 139 via the memory interface circuit 151.

In the event that a processor 126 needs to access the external transactional memory device 147, processor 126 generates a descriptor 130 and sends the descriptor 130 to DMA controller 136 via bus 131 and standard bus interface circuit 134. Descriptor 130 includes: (i) the length of the DMA operation in bytes, (ii) a read address from which to a fetch search key data set, and (iii) a write address to which result data values are to be written, and (iv) completion notification information. In response to receiving descriptor 130, DMA controller 136 stores the descriptor 130 in local memory 138, generates a search key data request 137, and sends the search key data request 137 to external memory 139 via memory interface circuit 151. The search key data request 137 is a function of the length of the DMA operation and the read address included in the descriptor 130. In response to receiving the search key data request 137, the external memory 139 sends search key data set 135 to the DMA controller 136 via the memory interface circuit 151. The search key data set includes header data 141 and multiple search keys (including search key 140). An example of multiple search key data sets is illustrated in FIG. 8. In response to receiving the search key data set 135, DMA controller 136 parses the header data 141 to identify a key size included in the header data 141. The key size is used to delineate the multiple search keys included in the search key data set 135 The DMA controller 136 then generates one lookup command message for each individual search key. The DMA controller 136 then communicates one lookup command message 143 at a time to Interlaken look-aside interface circuit 144. In response to receiving a lookup command message 143, Interlaken look-aside interface circuit 144 generates an Interlaken look-aside packed 145 including the single search key. Interlaken look-aside interface circuit sends the ILA packet 145 to the external transactional memory device 147 via Interlaken look-aside interface port 146. In response to receiving the ILA packet 145, the external transactional memory device 147 selects a result data value 142, generates an ILA packet 148 including the result data value 142, and sends the ILA packet 148 to Interlaken look-aside interface circuit 144 via Interlaken look-aside interface port 146. The Interlaken look-aside interface circuit reads the result data value 142 from the ILA packet 148 and communicates the result data value 142 to the DMA controller 136. In response to receiving the result data value 142, the DMA controller 136 stores the result data value 142 in local memory 138. The DMA controller repeats this process until all the search keys included in the search key data set 135 have been communicated to the external transactional memory device 147 and all resulting result data values have been received by the DMA controller 136 and stored in local memory 138. Once the DMA controller 136 has completed the processing of all the search keys included in the search key data set 135, the DMA controller 136 writes all the result data values stored in local memory 138 to external memory 139 via memory interface circuit 151 at the write address included in the descriptor 130. The DMA controller 136 also generates a DMA completion message 149 and sends the DMA completion message 149 via the standard bus interface circuit 134 to the processor 126 that was the source of descriptor 130. The DMA completion message includes the completion notification information included in the descriptor 130 and serves to provide notification to processor 130 that the accessing of the external transaction memory device 147 is completed. In response to receiving the DMA completion message, the processor 126 reads (via the bus 131, the standard bus interface circuit 134, and the memory interface circuit 151) the result data value 142 (and all other result data values stored in external memory 139 as a result of processing descriptor 130) from the external memory 139.

In the above example regarding FIG. 2, communication of the search key data request 137, the search key data set 135, and the result data value 142 is performed across dedicated wires connecting DMA controller 136 and memory interface circuit 151. It is noted herein that this configuration as illustrated is optional. In an alternative example, the search key data request 137, the search key data set 135, and the result data value 142 can be communicated via the standard bus interface circuit 134 thus avoiding the necessity of dedicated wires connecting the DMA controller 136 to the memory interface circuit 151. Both solutions have been conceived by the Applicant and are disclosed in the present application.

In a first effort to minimize the number of cycles the bus 131 is utilized to perform the bus communications described above, the search key data set 135 is communicated in chucks, wherein each chunk of search key data set 135 is the same number of bits as the bus 131 is wide. That is, if bus 131 is one hundred and twenty-eight bits wide then the external memory 139 will communicate the search key data set 135 one hundred and twenty-eight bits at a time across bus 131. Therefore, if the search key data set 135 is one hundred and twenty-eight bits or less, then the entire search key data set 135 will be written to the external memory 139 using a single bus transaction across bus 131. If the search key data set 135 is two hundred and fifty-six bits or less, then the entire search key data set 135 will written to external memory 139 using only two bus transactions. The detailed operation of the DMA controller 136 is discussed below with respect to more detailed diagrams shown in FIGS. 5-7.

In a second effort to minimize the number of cycles the bus 131 is utilized to perform the bus communications described above, the result data values are communicated in chucks, wherein each chunk of result data values is the same number of bits as the bus 131 is wide. That is, if bus 131 is one hundred and twenty-eight bits wide then the external memory 139 will communicate the result data values one hundred and twenty-eight bits at a time across bus 131. Therefore, if the sum of all result data values is one hundred and twenty-eight bits or less, then the all the result data values will be communicated using a single bus transaction across bus 131. If the sum of all the result data values is two hundred and fifty-six bits or less, then all the result data values will be communicated using only two bus transactions across bus 131.

Figure 3:
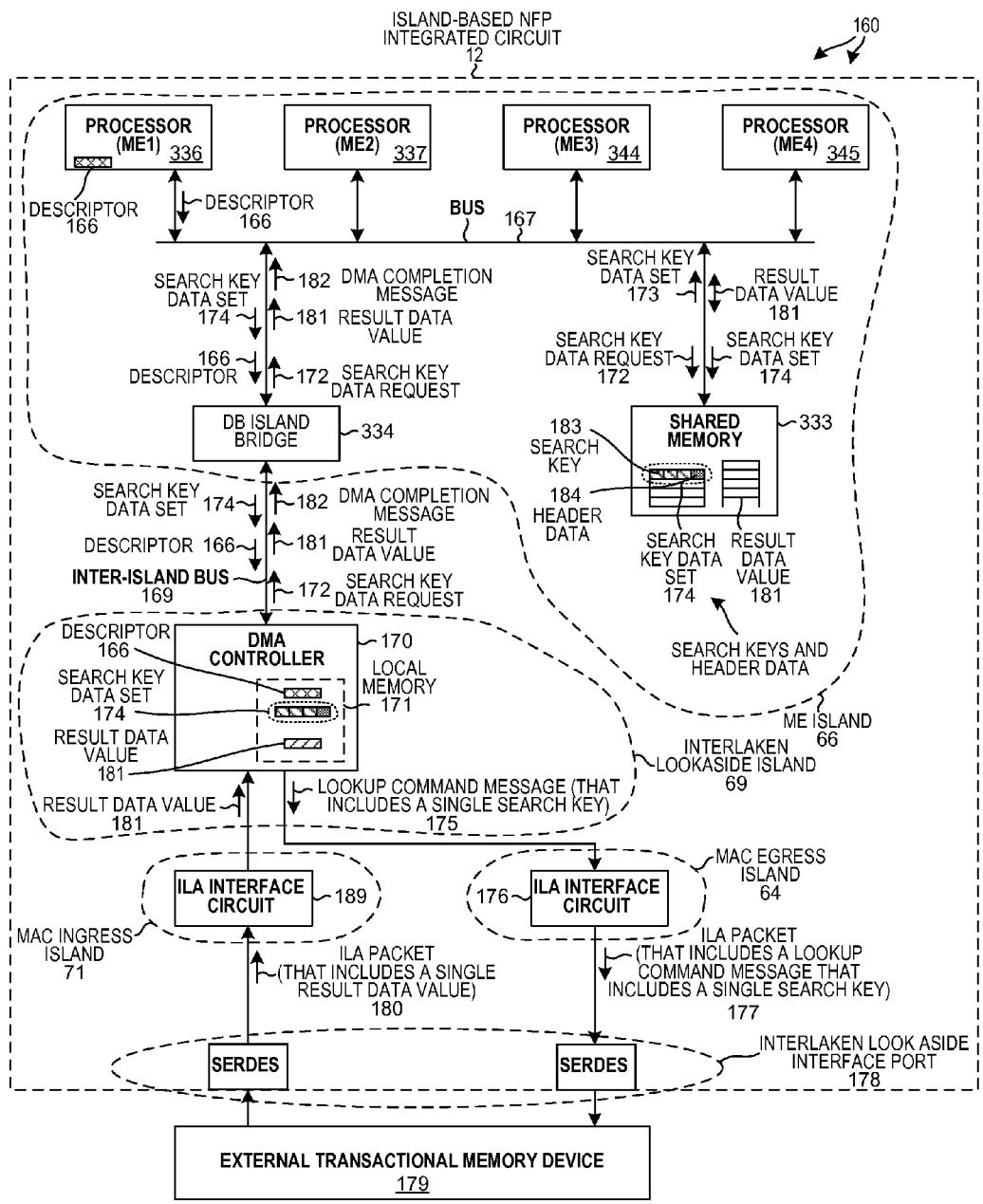
FIG. 3 is a simplified diagram of an Island-Based Network Flow Processor (IBNFP) with DMA controlled Interlaken look-aside interface circuit on-board.
Figure 18:
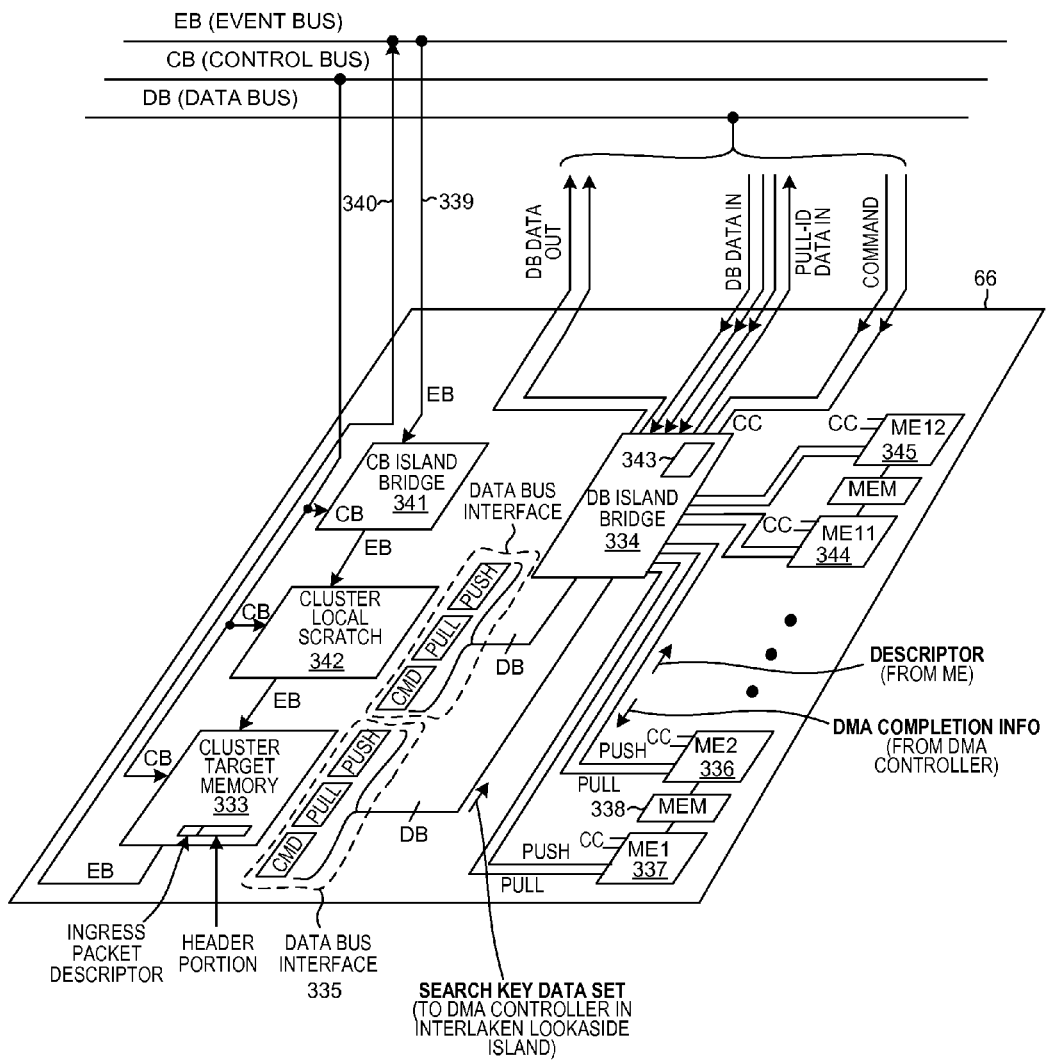
FIG. 18 is a diagram of an Micro Engine (ME) island.
Figure 19:
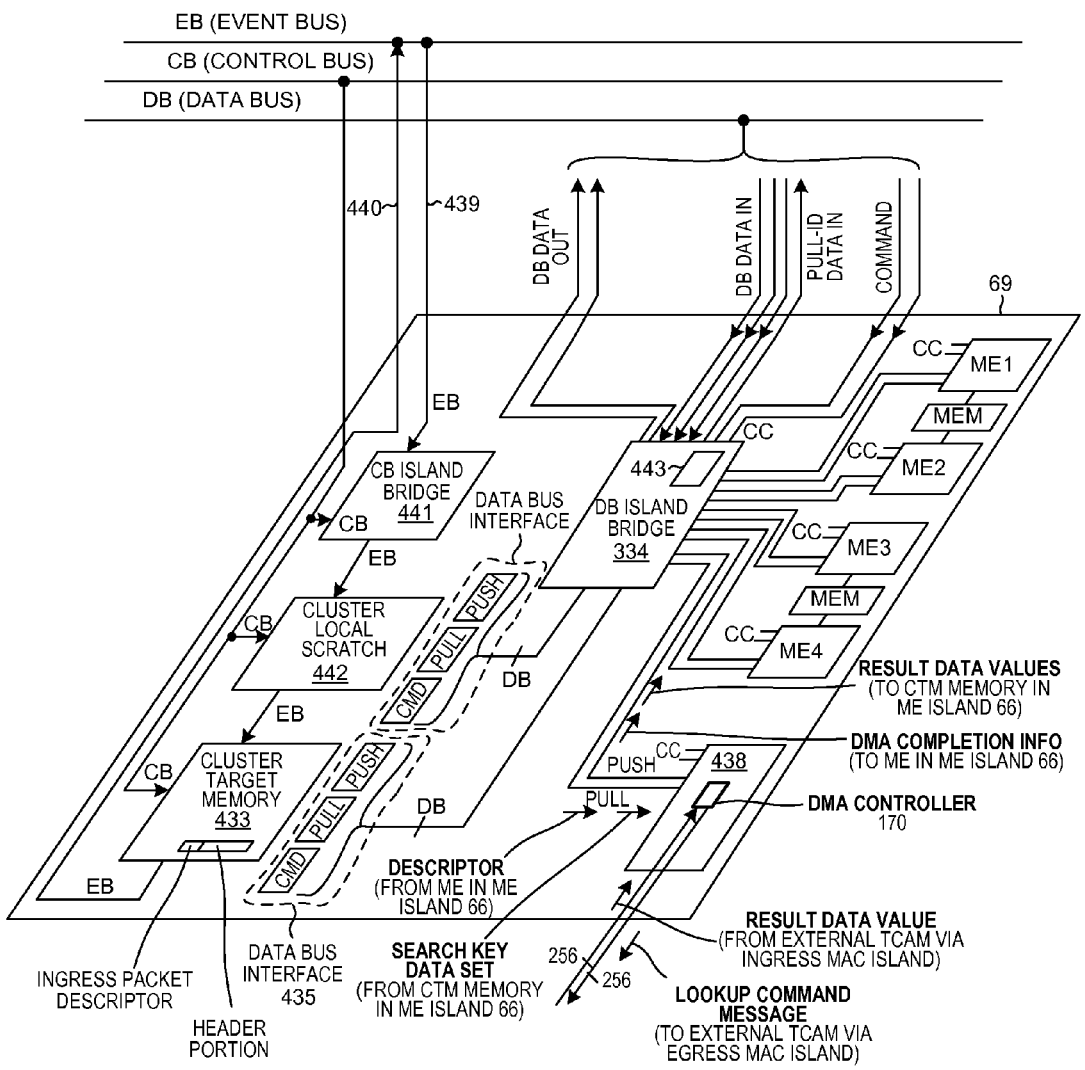
FIG. 19 is a diagram of an Interlaken island.

FIG. 3 is a simplified diagram of an Island-Based Network Flow Processor (IBNFP) with DMA controlled Interlaken look-aside interface circuit on-board. System 160 includes IBNFP 12 and external transactional memory device 179. IBNFP 12 includes an MicroEngine (ME) Island 66, a bus 169, an Interlaken look-aside island 69, and a Interlaken look-aside interface port 178. ME island 66 includes processors (366, 337, 344, 345), bus 167, shared memory 333, and a DB island bridge 334. Processors (366, 337, 344, 345), DB island bridge 334 and shared memory 333 communicate with bus 167. Bus 167 is an intra-island bus that interfaces to an inter-island bus via DB island bridge 334. A more detailed diagram of ME island 66 is provided in FIG. 18. Interlaken look-aside island 69 includes DMA controller 170. Interlaken look-aside island 69 also includes a DB island bridge 334 that is omitted from FIG. 3. A more detailed diagram of Interlaken look-aside island 69 (illustrating DB island bridge 334) is provided in FIG. 19.

The DMA controller 170 includes a local memory 171 that stores descriptors, search key data sets, and a result data values. Shared memory 333 also stores search key data sets and result data values. In operation, a search key data set 174 is stored in shared memory 333. In one example, processor 336 causes the search key data set 174 to be stored in shared memory 333. In another example, another processor causes search key data set 174 to be stored in shared memory 333. Regardless of the programming processor, the search key data set 174 is communicated to shared memory 333 via bus 167.

In the event that a processor 336 needs to access the external transactional memory device 179, processor 336 generates a descriptor 166 and sends the descriptor 166 to DMA controller 171 via bus 167, DB island bridge 334, and bus 169. In one example, bus 169 is a Command/Push/Pull (CPP) bus. For additional information on the configurable mesh CPP data bus, the configurable mesh control bus, and the configurable mesh event bus, see: U.S. patent application Ser. No. 13/399,324, entitled "Configurable Mesh Data Bus In An Island-Based Network Flow Processor", filed Feb. 17, 2012, by Gavin J. Stark (the entire subject matter of which is incorporated herein by reference). Descriptor 166 includes: (i) the length of the DMA operation in bytes, (ii) a read address from which to a fetch search key data set, and (iii) a write address to which result data values are to be written, and (iv) completion notification information. In response to receiving descriptor 166, DMA controller 170 stores the descriptor 166 in local memory 171, generates a search key data request 172, and sends the search key data request 172 to shared memory 333 via bus 167, DB island bridge 334, and bus 169. The search key data request 172 is a function of the length of the DMA operation and the read address included in the descriptor 166. In response to receiving the search key data request 172, the shared memory 333 sends search key data set 174 to the DMA controller 170 via bus 167, DB island bridge 334, and bus 169. The search key data set includes header data 184 and multiple search keys (including search key 183). An example of multiple search key data sets is illustrated in FIG. 8. In response to receiving the search key data set 174, DMA controller 170 parses the header data 184 to identify a key size included in the header data 184. The key size is used to delineate the multiple search keys included in the search key data set 174. The DMA controller 170 then generates one lookup command message for each individual search key. The DMA controller 170 then communicates one lookup command message 175 at a time to Interlaken look-aside interface circuit 176 (located on MAC egress island 64). In response to receiving a lookup command message 175, Interlaken look-aside interface circuit 176 generates an Interlaken look-aside packed 177 including the single search key. Interlaken look-aside interface circuit sends the ILA packet 177 to the external transactional memory device 179 via Interlaken look-aside interface port 178. In response to receiving the ILA packet 177, the external transactional memory device 179 selects a result data value 181, generates an ILA packet 180 including the result data value 181, and sends the ILA packet 180 to Interlaken look-aside interface circuit 189 (located on MAC ingress island 71) via Interlaken look-aside interface port 178. The Interlaken look-aside interface circuit 189 reads the result data value 181 from the ILA packet 180 and communicates the result data value 181 to the DMA controller 170. In response to receiving the result data value 181, the DMA controller 170 stores the result data value 181 in local memory 171. The DMA controller repeats this process until all the search keys included in the search key data set 174 have been communicated to the external transactional memory device 179 and all resulting result data values have been received by the DMA controller 170 and stored in local memory 171. Once the DMA controller 170 has completed the processing of all the search keys included in the search key data set 174, the DMA controller 170 writes all the result data values stored in local memory 171 to shared memory 333 via bus 167, DB island bridge 334, and bus 169 at the write address included in the descriptor 166. The DMA controller 170 also generates a DMA completion message 182 and sends the DMA completion message 182 via bus 167, DB island bridge 334, and bus 169 to the processor 336 that was the source of descriptor 166. The DMA completion message includes the completion notification information included in the descriptor 166 and serves to provide notification to processor 336 indicating that the accessing of the external transaction memory device 179 is completed. In response to receiving the DMA completion message, the processor 336 reads (via the bus 167) the result data value 181 (and all other result data values stored in shared memory 333 as a result of processing descriptor 166) from the shared memory 333.

In a first effort to minimize the number of cycles the inter-island bus 169 is utilized to perform the bus communications described above, the search key data set 174 is communicated in chucks, wherein each chunk of search key data set 174 is the same number of bits as the bus 169 is wide. That is, if bus 169 is one hundred and twenty-eight bits wide then the shared memory 333 will communicate the search key data set 174 one hundred and twenty-eight bits at a time across bus 169. Therefore, if the search key data set 174 is one hundred and twenty-eight bits or less, then the entire search key data set 174 will be read from the shared memory 333 using a single bus transaction across bus 169. If the search key data set 174 is two hundred and fifty-six bits or less, then the entire search key data set 174 will be read from shared memory 333 using only two bus transactions. The detailed operation of the DMA controller 170 is discussed below with respect to more detailed diagrams shown in FIGS. 5-7.

In a second effort to minimize the number of cycles the inter-island bus 169 is utilized to perform the bus communications described above, the result data values are communicated in chucks, wherein each chunk of result data values is the same number of bits as the bus 169 is wide. That is, if bus 169 is one hundred and twenty-eight bits wide then the shared memory 333 will communicate the result data values one hundred and twenty-eight bits at a time across bus 169. Therefore, if the sum of all result data values is one hundred and twenty-eight bits or less, then the all the result data values will be communicated using a single bus transaction across bus 169. If the sum of all the result data values is two hundred and fifty-six bits or less, then all the result data values will be communicated using only two bus transactions across bus 169.

Figure 4:
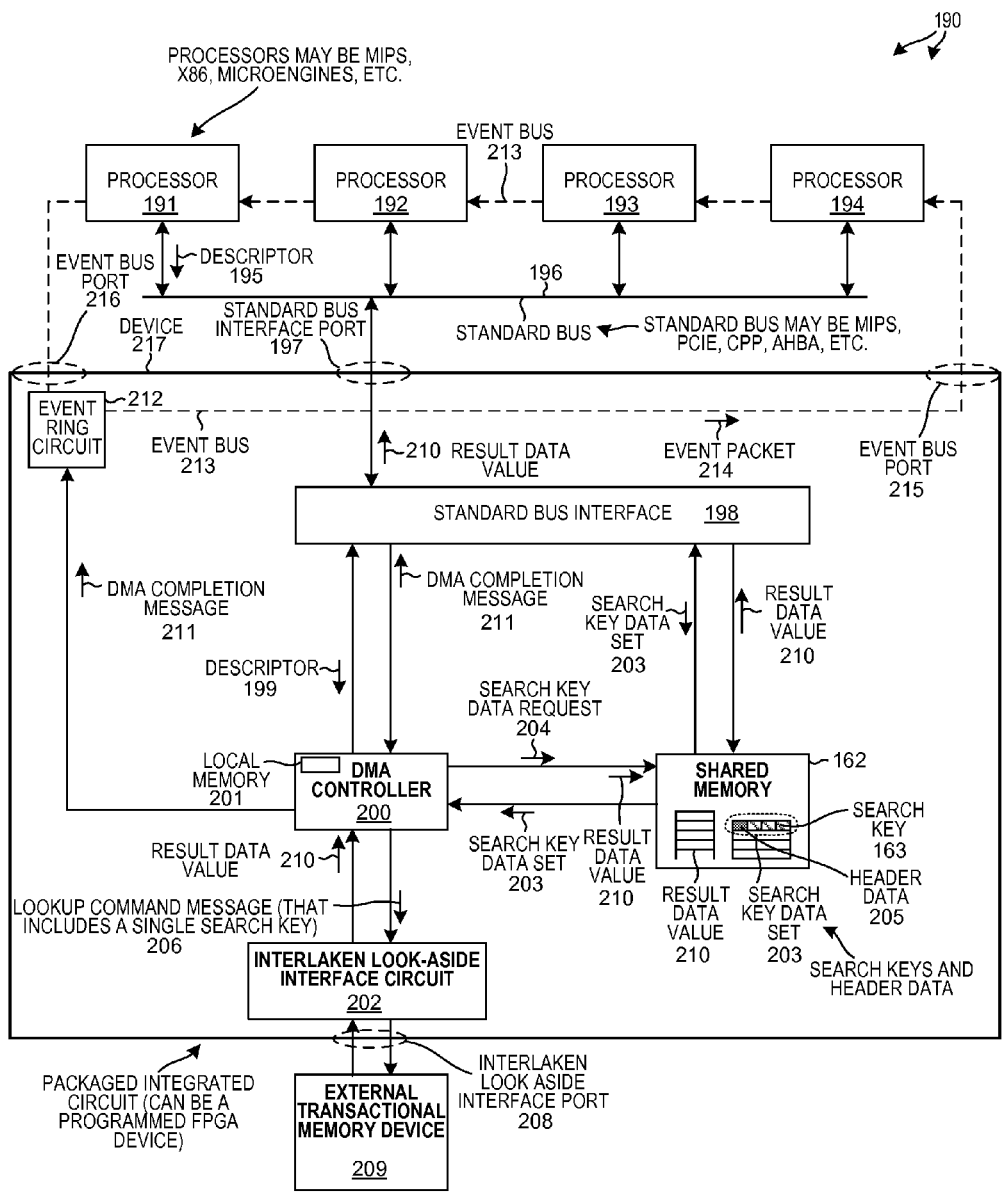
FIG. 4 is a simplified diagram of a DMA controlled Interlaken look-aside circuit with internal memory, a standard bus interface circuit, and an event bus interface circuit.

FIG. 4 is a simplified diagram of a DMA controlled Interlaken look-aside circuit with internal memory, a standard bus interface circuit, and an event bus interface circuit. System 190 includes processors 190-194, bus 196, device 217, and external transactional memory device 209. Device 217 is a DMA controlled Interlaken look-aside circuit with a standard bus interface circuit 198 and internal shared memory 162. Processors 191-194 and device 217 communicate with bus 196. Bus 196 is a standard bus such as a Peripheral Component Interconnect Express (PCIe) bus interface, and Universal Serial Bus (USB) bus interface, or an Advanced Microcontroller Bus (AMBA) bus interface. Device 217 includes DMA controller 200, standard bus interface circuit 198, internal shared memory 162, and Interlaken Look-Aside (ILA) interface circuit 202. Device 217 also includes two ports: (i) a standard bus interface port 133, and (ii) a Interlaken look-aside interface port 202. The DMA controller 200 includes a local memory 201 that stores descriptors, search key data sets, and a result data values. Internal shared memory 162 also stores search key data sets and result data values. In operation, a search key data set 203 is stored in shared memory 162. In one example, processor 191 causes the search key data set 203 to be stored in shared memory 162. In another example, another processor causes search key data set 203 to be stored in shared memory 203. Regardless of the programming processor, the search key data set 203 is communicated to shared memory 162 by first being communicated to the standard bus interface circuit 198 via bus 196 and then communicated from the standard bus interface circuit 198 to the shared memory 162.

In the event that a processor 191 needs to access the external transactional memory device 209, processor 191 generates a descriptor 195 and sends the descriptor 195 to DMA controller 200 via bus 196 and standard bus interface circuit 198. Descriptor 195 includes: (i) the length of the DMA operation in bytes, (ii) a read address from which to a fetch search key data set, and (iii) a write address to which result data values are to be written, and (iv) completion notification information. In response to receiving descriptor 195, DMA controller 200 stores the descriptor 195 in local memory 201, generates a search key data request 204, and sends the search key data request 204 to shared memory 162. The search key data request 204 is a function of the length of the DMA operation and the read address included in the descriptor 195. In response to receiving the search key data request 204, the shared memory 162 sends search key data set 203 to the DMA controller 200. The search key data set includes header data 205 and multiple search keys (including search key 163). An example of multiple search key data sets is illustrated in FIG. 8. In response to receiving the search key data set 203, DMA controller 200 parses the header data 205 to identify a key size included in the header data 205. The key size is used to delineate the multiple search keys included in the search key data set 203. The DMA controller 200 then generates one lookup command message for each individual search key. The DMA controller 200 then communicates one lookup command message 206 at a time to Interlaken look-aside interface circuit 202. In response to receiving a lookup command message 206, Interlaken look-aside interface circuit 202 generates an Interlaken look-aside packed including the single search key. Interlaken look-aside interface circuit sends the ILA packet to the external transactional memory device 209 via Interlaken look-aside interface port 208. In response to receiving the ILA packet, the external transactional memory device 209 selects a result data value 210, generates an ILA packet including the result data value 210, and sends the ILA packet to Interlaken look-aside interface circuit 202 via Interlaken look-aside interface port 208. The Interlaken look-aside interface circuit reads the result data value 210 from the ILA packet and communicates the result data value 210 to the DMA controller 200. In response to receiving the result data value 210, the DMA controller 200 stores the result data value 210 in local memory 201. The DMA controller repeats this process until all the search keys included in the search key data set 203 have been communicated to the external transactional memory device 209 and all resulting result data values have been received by the DMA controller 200 and stored in local memory 201. Once the DMA controller 200 has completed the processing of all the search keys included in the search key data set 203, the DMA controller 200 writes all the result data values stored in local memory 201 to shared memory 162 at the write address included in the descriptor 195. The DMA controller 200 also generates a DMA completion message 211. In one example, DMA controller 200 sends the DMA completion message 211 via the standard bus interface circuit 198 to the processor 191 that was the source of descriptor 195. In another example, DMA controller 200 sends the DMA completion message 211 to event ring circuit 212, which generates an event packet that includes the DMA completion message and communicates the event packet to processor 191 via event bus 213. For additional information on the configurable mesh event bus and how it can be configured to form one or more event rings and chains, see: 1) U.S. patent application Ser. No. 13/399,678, entitled "Local Event Ring In An Island-Based Network Flow Processor", filed Feb. 17, 2012, by Gavin J. Stark; and 2) U.S. patent application Ser. No. 13/399,983, entitled "Global Event Chain In An Island-Based Network Flow Processor", filed Feb. 17, 2012, by Gavin J. Stark (the entire contents of both of these applications is incorporated herein by reference). The DMA completion message includes the completion notification information included in the descriptor 195 and serves to provide notification to processor 191 that the accessing of the external transaction memory device 209 is completed. In response to receiving the DMA completion message, the processor 191 reads (via the bus 196 and the standard bus interface circuit 198) the result data value 210 (and all other result data values stored in shared memory 162 as a result of processing descriptor 195) from the shared memory 162.

In the above example regarding FIG. 4, communication of the search key data request 204, the search key data set 203, and the result data value 210 is performed across dedicated wires connecting DMA controller 200 and shared memory 162. It is noted herein that this configuration as illustrated is optional. In an alternative example, the search key data request 204, the search key data set 203, and the result data value 210 can be communicated via the standard bus interface circuit 198 thus avoiding the necessity of dedicated wires connecting the DMA controller 200 to the shared memory 162. Both solutions have been conceived by the Applicant and are disclosed in the present application.

In a first effort to minimize the number of cycles the bus 196 is utilized to perform the bus communications described above, the search key data set 203 is communicated in chucks, wherein each chunk of search key data set 203 is the same number of bits as the bus 196 is wide. That is, if bus 196 is one hundred and twenty-eight bits wide then the shared memory 162 will communicate the search key data set 203 one hundred and twenty-eight bits at a time across bus 196. Therefore, if the search key data set 203 is one hundred and twenty-eight bits or less, then the entire search key data set 203 will be written to the shared memory 162 using a single bus transaction across bus 196. If the search key data set 203 is two hundred and fifty-six bits or less, then the entire search key data set 203 will written to shared memory 162 using only two bus transactions. The detailed operation of the DMA controller 200 is discussed below with respect to more detailed diagrams shown in FIGS. 5-7.

In a second effort to minimize the number of cycles the bus 196 is utilized to perform the bus communications described above, the result data values are communicated in chucks, wherein each chunk of result data values is the same number of bits as the bus 196 is wide. That is, if bus 196 is one hundred and twenty-eight bits wide then the shared memory 162 will communicate the result data values one hundred and twenty-eight bits at a time across bus 162. Therefore, if the sum of all result data values is one hundred and twenty-eight bits or less, then the all the result data values will be communicated using a single bus transaction across bus 162. If the sum of all the result data values is two hundred and fifty-six bits or less, then all the result data values will be communicated using only two bus transactions across bus 162.

Figure 5:
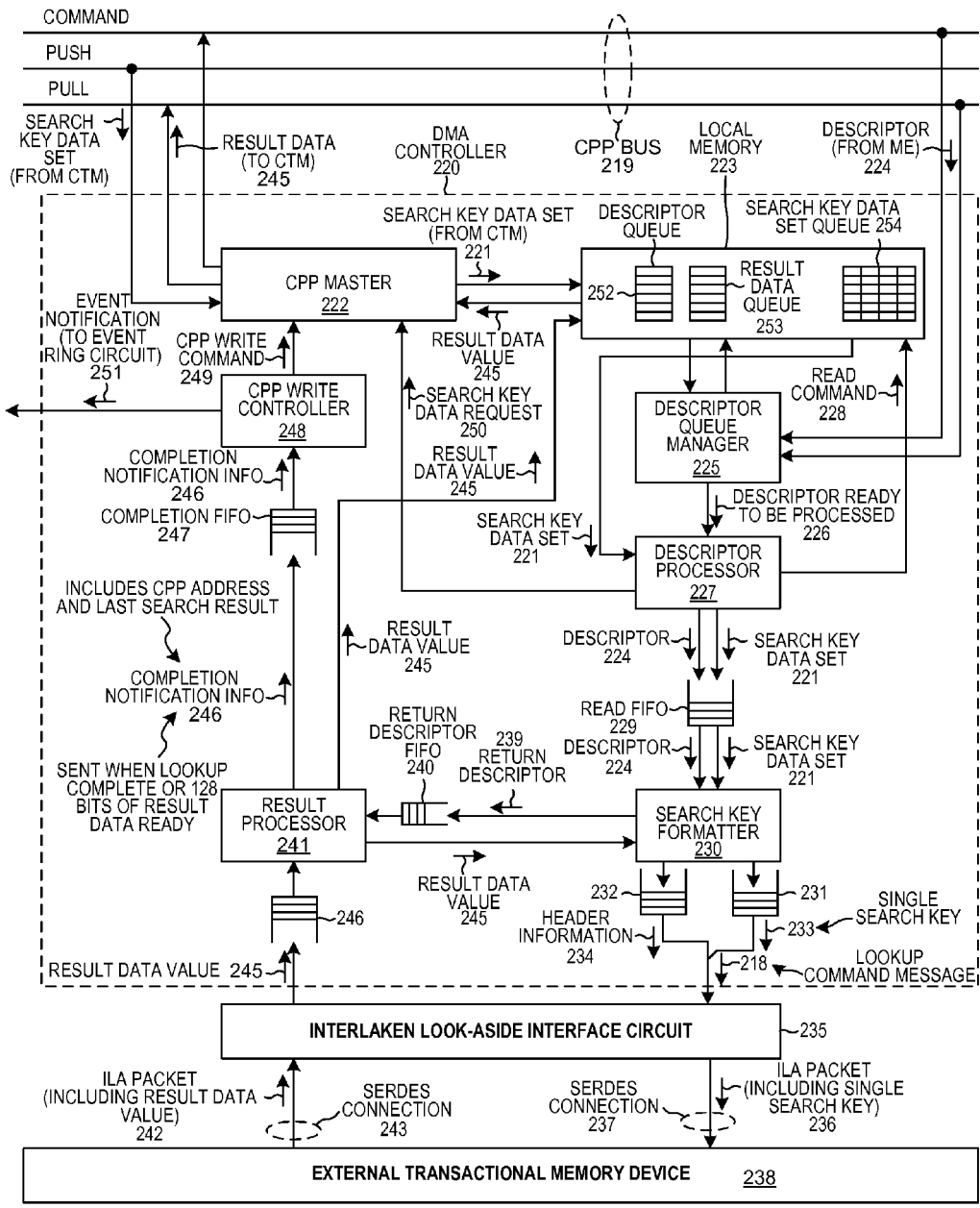
FIG. 5 is a more detailed diagram of a DMA controller.

FIG. 5 is a more detailed diagram of a DMA controller. The exemplary DMA controller of FIG. 5 may be used to implement the DMA controllers show in FIGS. 1 through 4. DMA controller 220 communicates with one or more processors (e.g. microengines) across a Command/Push/Pull (CPP) bus 219. The details of the CPP bus operation are discussed above regarding FIG. 3. DMA controller 220 also communicates with an Interlaken Look-Aside (ILA) interface circuit 235. As discussed above, the function of the ILA interface circuit 235 is to encode and decode ILA packets and manage communication of the ILA packets to an external transactional memory device 238. DMA controller 220 includes a CPP master 222, a local memory 223, a CPP write controller 248, descriptor queue manager 225, descriptor processor 227, search key formatter 230, result processor 241, and First In First Out (FIFOs) 229, 231, 232, 240, 246, and 247.

Figure 9:
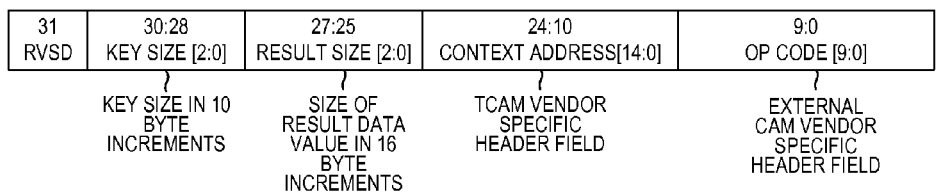
FIG. 9 is a diagram illustrating the fields included in the header.

In operation, DMA controller receives a descriptor 224 from a processor across CPP bus 219. The descriptor 224 is coupled to descriptor queue manager 225. Descriptor queue manager 225 performs two functions: (i) writes received descriptors to descriptor queue 252 in local memory 223, and (ii) selects a descriptor ready to be processed 226. The descriptor queue manager 225 communicates the descriptor ready to be processed 226 to descriptor processor 227. Descriptor processor 227 performs three functions. The first function is to write a search key data request 250 to CPP master 222. In turn, CPP master 222 communicates the search key data request 250 to a shared memory via CPP bus 219. In response to receiving the search key data request 250, the shared memory writes search key data set 221 back across CPP bus 219. In one example, the search key data set 221 is communicated across CPP bus 219 is one hundred and twenty-eight byte chunks. The search key data set 221 is received by CPP master 222 and in turn is written to search key data set queue 254 in local memory 223. The second function is to read the search key data set 221 from the local memory 223. The third function is to write the search key data set 221 and the descriptor 224 to search key formatter 230. In one example, read FIFO 229 is used to buffer each descriptor and search key data set pair. As discussed above, a search key data set includes multiple search keys and header data. A detailed illustration of the contents in the header data is provided in FIG. 9. A descriptor includes (i) the length of the DMA operation in bytes, (ii) a read address from which to a fetch search key data set, and (iii) a write address to which result data values are to be written, and (iv) completion notification information.

In response to receiving descriptor 224 and search key data set 221, search key formatter 230 generates a lookup command 218 and a return descriptor 239. The lookup command 218 includes a single search key 234 selected from the multiple search keys included in the search key data set 221. More specific details of the search key formatter are provided in FIG. 6. The lookup command 218 also includes header information 234, which includes commands to be executed by the external transactional memory 238. The return descriptor 239 includes a subset of descriptor 224. More specifically, descriptor 239 includes (i) the length of the DMA operation in bytes, (ii) a write address to which result data values are to be written, and (iii) completion notification information. In a more specific example, return descriptor 239 includes an ILA application specific data, expected result data value size in 16-byte increments, signal master value, signal reference value, completion flag, DMA last flag, target64 value, a token value, a target_id value, and a CPP address. Result processor 241 receives return descriptor 239 via return descriptor FIFO 240. The lookup command message 218 is communicated to the ILA interface circuit 235. In response to receiving the lookup command message 218, the ILA interface circuit 235 generates ILA packet 236. ILA packet 236 includes a single search key 233. In turn, the ILA interface circuit 235 sends the ILA packet 236 to external transactional memory device 238. In one example, the ILA packet 237 is sent via SERDES connection 237 and the external transactional memory device 238 is a Ternary Content Addressable Memory (TCAM). In response to receiving the ILA packet 236, the external content addressable memory 235 generates a result data value 245 that is associated with the single search key 233. The external transactional memory device 238 generates a second ILA packet 242 that includes the result data value 245. The ILA packet 242 is communicated to the ILA interface circuit 235 via SERDES connection 243. In response to receiving the ILA packet 242 the ILA interface circuit 235 de-encapsulates the ILA packet 242 and communicates the result data value 245 to result processor 241. In one example, FIFO 246 is used to buffer result data value that are communicated to result processor 241. In response to receiving the result data value 245, the result processor 241 communicates the result data value 245 to search key formatter 230. The result processor 241 uses the length of DMA operation in bytes (included in return descriptor 239) to determine with all result data values from search key data set 221 are received. Each result data value is stored in the result data queue 253 in local memory 223.

Once the result processor 241 determines that all the result data values associated with the descriptor 224 have been received and stored, result processor 241 sends a write result data values command to CPP write controller 248. In turn, CPP write controller 248 generates a write command to write all results data values associated with descriptor 224 to the shared memory. The result processor 241 then uses the completion notification information (included in the return descriptor 239) to generate completion notification information 246. Result processor 241 communicates the completion notification information 246 to CPP write controller 222. The completion notification information 246 includes: (i) identification of the processor that created the descriptor 224, and (ii) a message indicating that all the result data values associated with the descriptor have been received and stored in the shared memory. In one example, completion notification information is buffered via completion FIFO 247.

Figure 6:
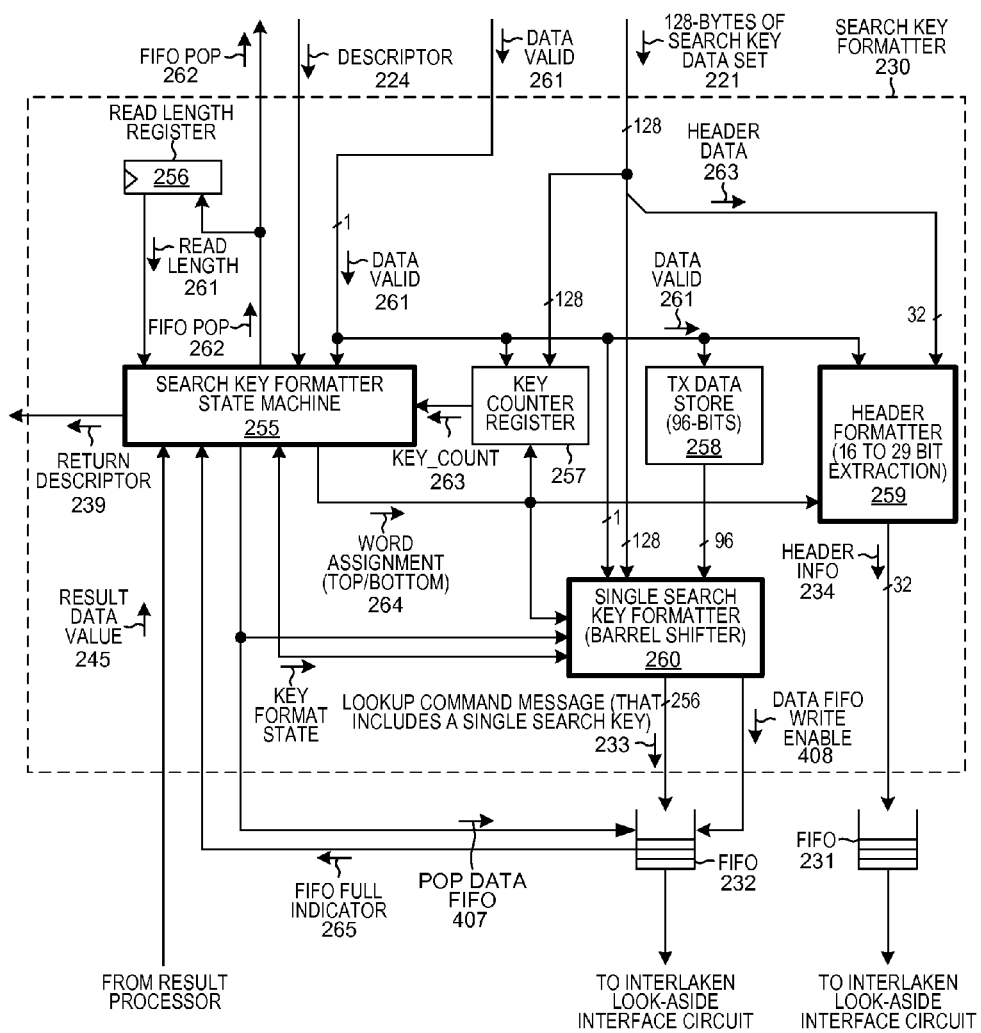
FIG. 6 is a more detailed diagram of a search key formatter of the DMA controller illustrated in FIG. 5.
Figure 11A:
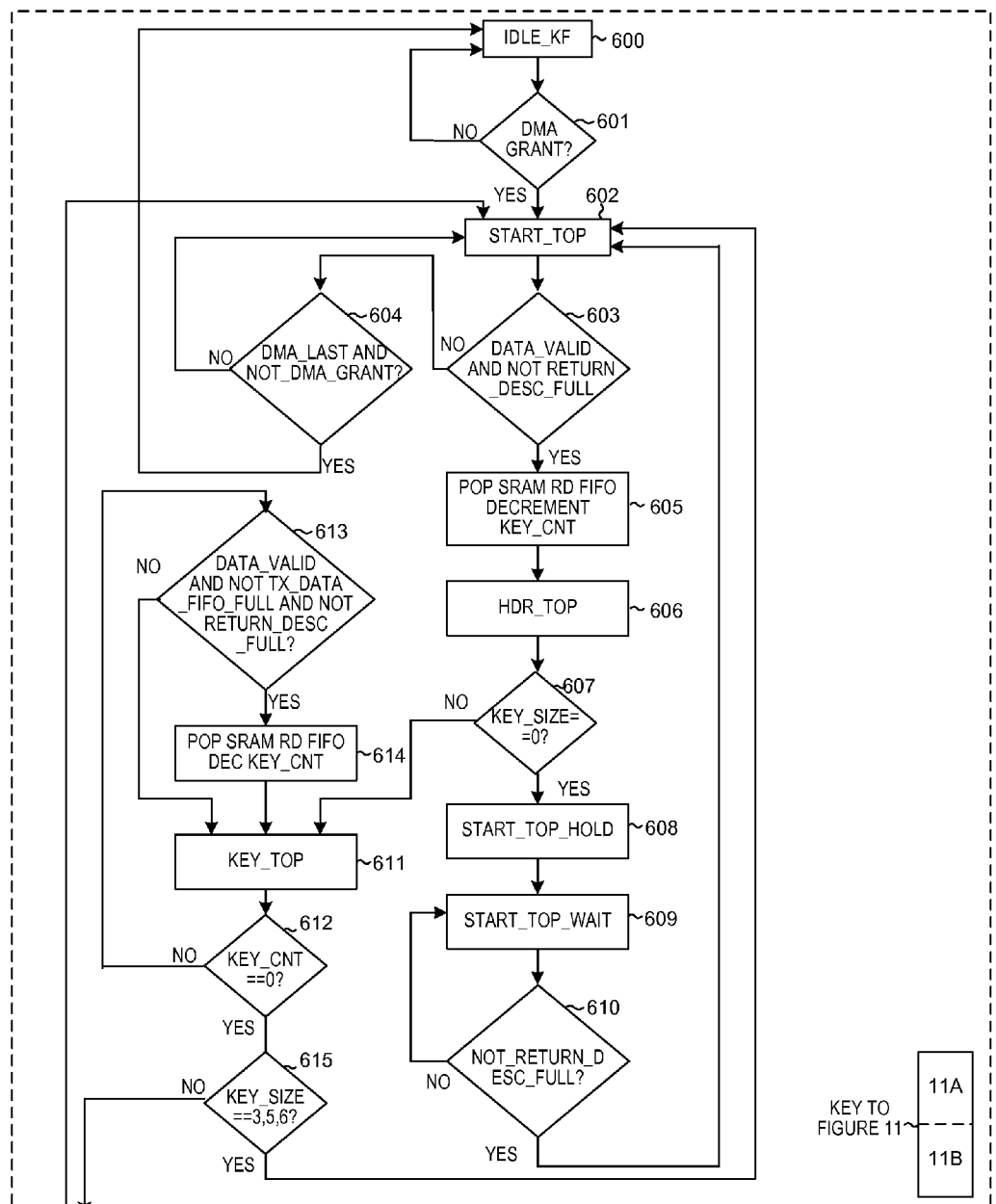
FIG. 11A is a diagram of a part of larger diagram 11 that illustrates the operation of the state machine 255 within the search key formatter 230.
Figure 11B:
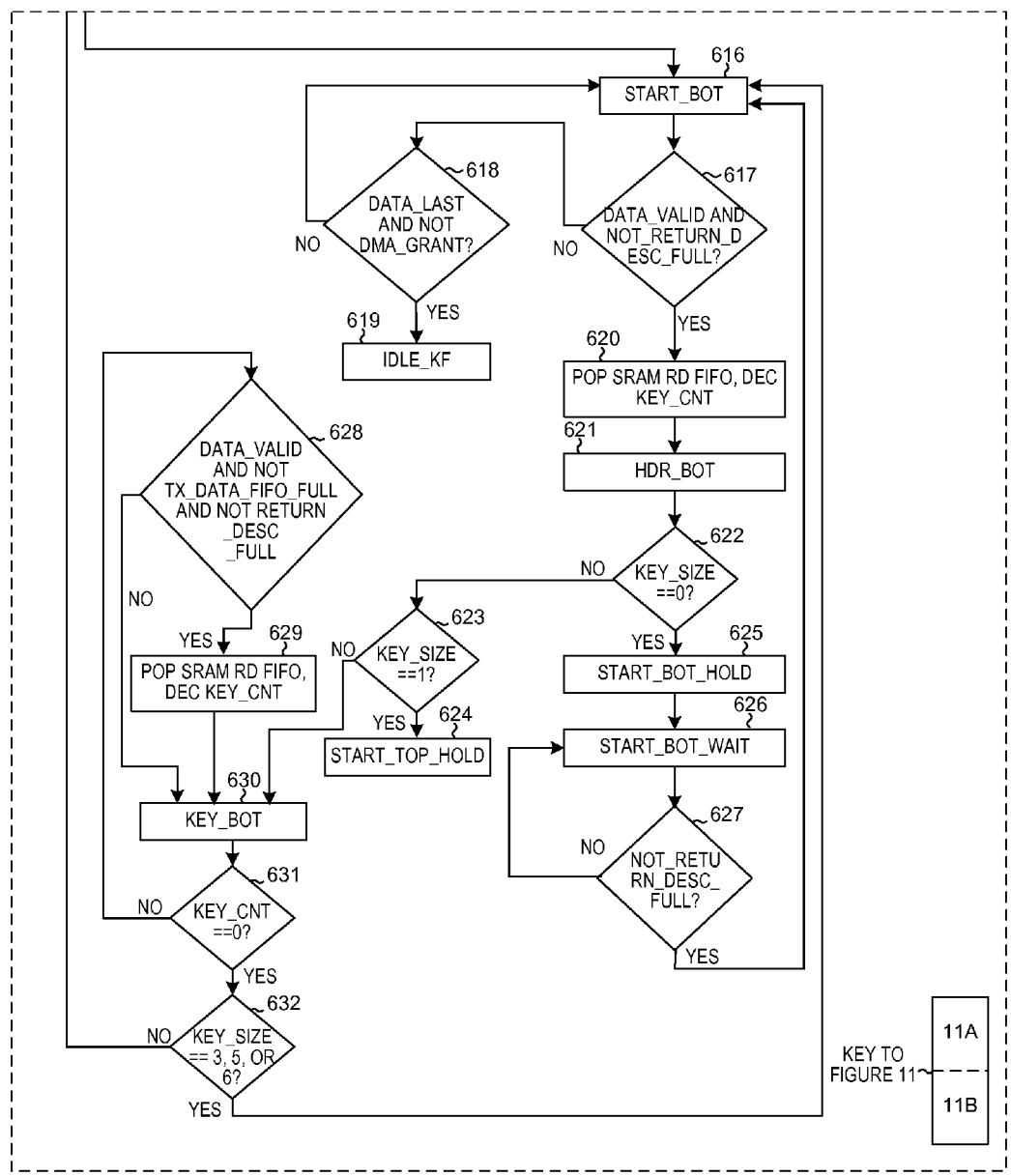
FIG. 11B is a diagram of a part of larger diagram 11 that illustrates the operation of the state machine 255 within the search key formatter 230.

FIG. 6 is a more detailed diagram of the search key formatter of the DMA controller. The example search key formatter 230 shown in FIG. 6 is designed to process 8-byte search keys. The search key formatter 230 is designed to process 16-bytes at a time and generate a 32-byte WRITE_DATA format and HEADER_WR_DATA (29-bits). The HEADER_WR_DATA bus carries the ILA overhead bits and the length of the burst in bytes. The search key formatter state machine 255 contains a "top" state and "bottom" states, also referred to as word assignment 264. Word assignment 264 is utilized to allow proper processing of search key data sets that end on an 8-byte boundary when the next search key data set starts on an upper 8-byte boundary. FIG. 8 illustrates the "top" and "bottom" word organization of search key data sets in memory. The steps performed by the search key formatter state machine 255 are illustrated in FIG. 11.

Search key data formatter state machine 255 transitions from an IDLE-KF state to a START_TOP state when data valid 261 is asserted and FIFO full indicator 265 is not asserted. The read length register 256 is loaded with a value that indicates the size of the DMA in bytes. In the START_TOP state the key_count is loaded using the key size value included in the header data to calculate the length of the search key. The search key formatter state machine 255 then transitions to HDR_TOP state and FIFO POP signal 262 is asserted. FIFO POP 262 is communicated to read FIFO 229. In response, read FIFO 229 outputs another 128-bytes of a search key data set. The 32-bit header data 263 (included in the 128-bytes of search key data set) is communicated to header formatter 259. Header data 263 includes context address information and opcode information that will be used by the ILA interface circuit and the external transactional memory device. In response to receiving header data 263, header formatter 259 outputs 33-bits of header information 234. Header information 234 includes 4-bits of look up size information and 29-bits of ILA overhead information. The ILA overhead information includes context address and Op-Code information used by the external transactional memory device 238. Header information 234 is output in parallel with lookup command message 233. The header information 234 and the lookup command message 233 is output the search key formatter state machine 255 transitions to START_TOP state or START_BOT state.

In the HDR_TOP state, the state machine transitions to the START_TOP_HOLD state if the key size field is zero. If the key size field is not zero, then the state machine transitions from HDR_TOP state to KEY_TOP state. START_TOP_HOLD transitions to START_TOP_WAIT in the next cycle. In START_TOP_WAIT state the state machine stays in the START_TOP_WAIT state until the RETURN_DESC_FULL is not asserted. When RETURN_DESC_FULL is not asserted, the state machine transitions from START_TOP_WAIT to START_TOP state.

Search key formatter state machine 255 transitions from HDR_TOP state to KEY_TOP state if the key size field is not zero. The KEY_TOP state FIFOs 232 and 231 are popped until key_count reaches zero. FIFO POP 262 is gated by the data valid 261 being asserted and the FIFO full indicator 265 not being asserted. When the key_count reaches zero, the state machine transitions from the HDR_TOP state to the START_BOT where the processing of the next search key is performed.

Every pop of read FIFO 229 decrements the read length value 261 stored in read length register 256. When the read length value 261 reaches zero, the DMA has been completed and the state machine transitions back to IDLE_KF.

Figure 7:
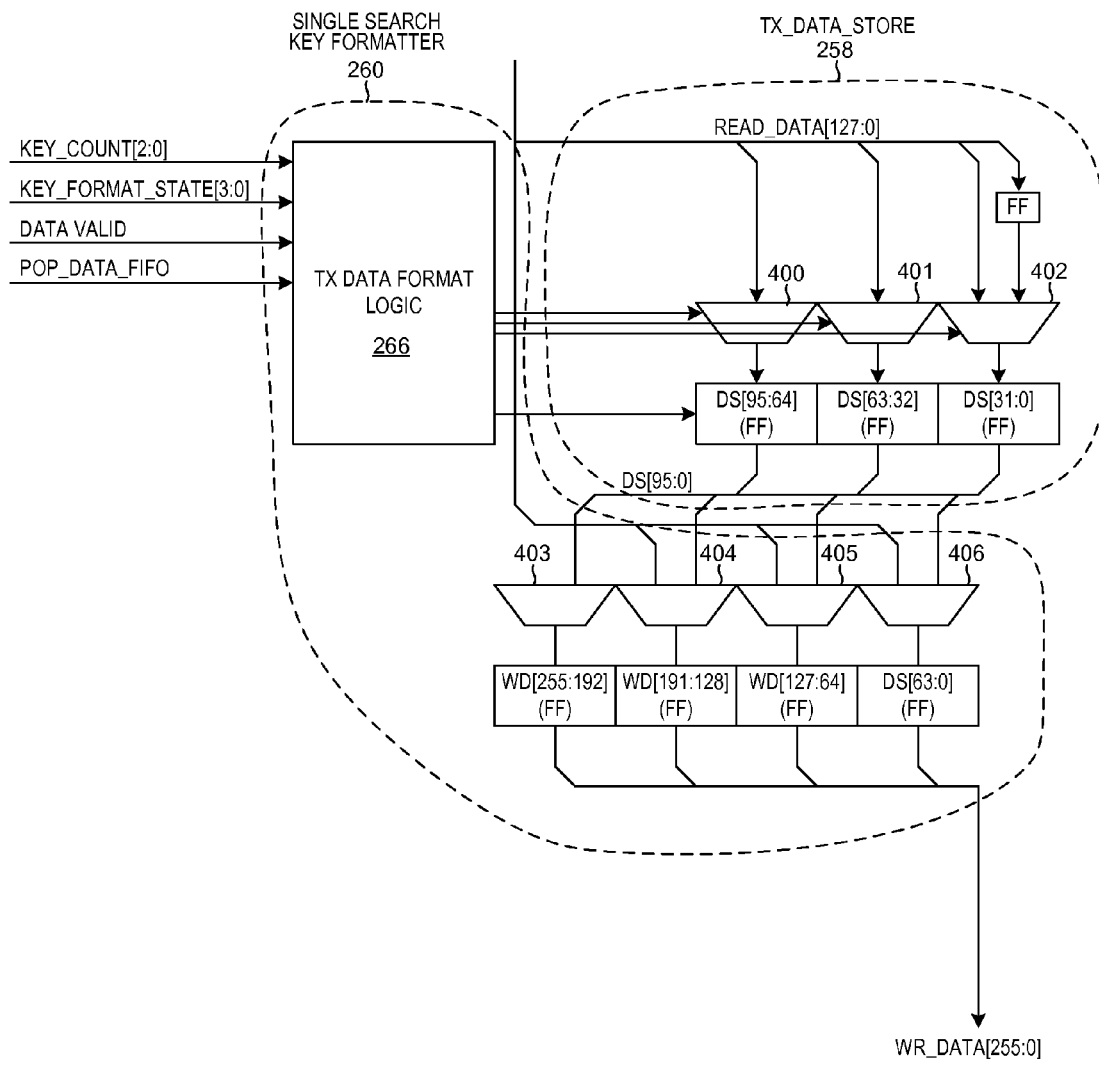
FIG. 7 is a more detailed diagram of the single search key formatter logic block and the TX_DATA_STORE logic block of the search key formatter.

FIG. 7 is a more detailed diagram of the TX data store 258 and the single search key formatter 260 of the search key formatter 230. TX data store 258 stores 96-bits of search key data (also referred to as READ_DATA[127:0]) in DATA_STORE[96:0] when the first cycle of search key data from a search key data set is processed. The TX data store 258 processes the 128-bytes of READ_DATA and generates 96-bytes of data to single search key formatter 260. The single search key formatter 260 uses the state signals from the search key formatter state machine 255 to perform barrel shifting to create the 256-byte lookup command message 233 (also referred to as "WR_DATA[255:0]").

When the state machine is the HDR_TOP state and the key size is zero, the READ_DATA is loaded in the WR_DATA as shown below:
WR_DATA[255:192]={READ_DATA[63:32], READ_DATA[95:32]}
WR_DATA[191:128]={READ_DATA[127:96], 32'h0}
WR_DATA[127:0]=WR_DATA[127:0]
And DATA_FIFO_WRITE_ENABLE is asserted.

When the state machine is the HDR_TOP state and the key size is not zero, the READ_DATA is stored in the DATA_STORE as shown below:
DATA_STORE [95:64]=READ_DATA[63:32]
DATA_STORE [63:32]=READ_DATA[95:32]
DATA_STORE [31:00]=READ_DATA[127:96]

In the KEY_TOP state the WR_DATA is loaded as shown below during the even cycles:
WR_DATA[255:192]=DATA_STORE [95:32]
WR_DATA[191:128]={DATA_STORE [31:0], READ_DATA[31:0]}
WR_DATA[127:64]={READ_DATA[63:32], READ_DATA[95:64]}
WR_DATA[63:0]={READ_DATA[127:96], 32'h0}}

In the KEY_TOP state the WR_DATA is loaded as shown below during the odd cycles:
WR_DATA[255:192]=WR_DATA [255:192]
WR_DATA[191:128]=WR_DATA[191:128]
WR_DATA[127:64]=WR_DATA[127:64]
WR_DATA[63:0]={WR_DATA[63:32], READ_DATA [31:0]}
DATA_STORE [95:64]=READ_DATA[63:32],
DATA_STORE [63:32]=READ_DATA[95:32]
DATA_STORE [31:00]=READ_DATA[127:96]

In one example, DATA_FIFO_WRITE_ENABLE 408 is asserted to cause FIFO 232 to the look up command message ("WR_DATA"). When the key_count reaches zero while the state machine is in the KEY_TOP state and the data valid 261 is asserted, the final write of the lookup command message ("WR_DATA") is as shown below:
WR_DATA[255:192]=DATA_STORE [95:32]
WR_DATA[191:128]={DATA_STORE [31:0], WR_DATA[159:128]}
WR_DATA[127:64]=WR_DATA[127:64]
WR_DATA[64:0]=WR_DATA[64:0]

FIG. 12 is a state table illustrating how WR_DATA[255:0] and DATA_STORE[95:0] are generated. FIG. 13 is a state table illustrating how DATA_FIFO_WRITE_ENABLE 408 is generated.

Figure 10A:
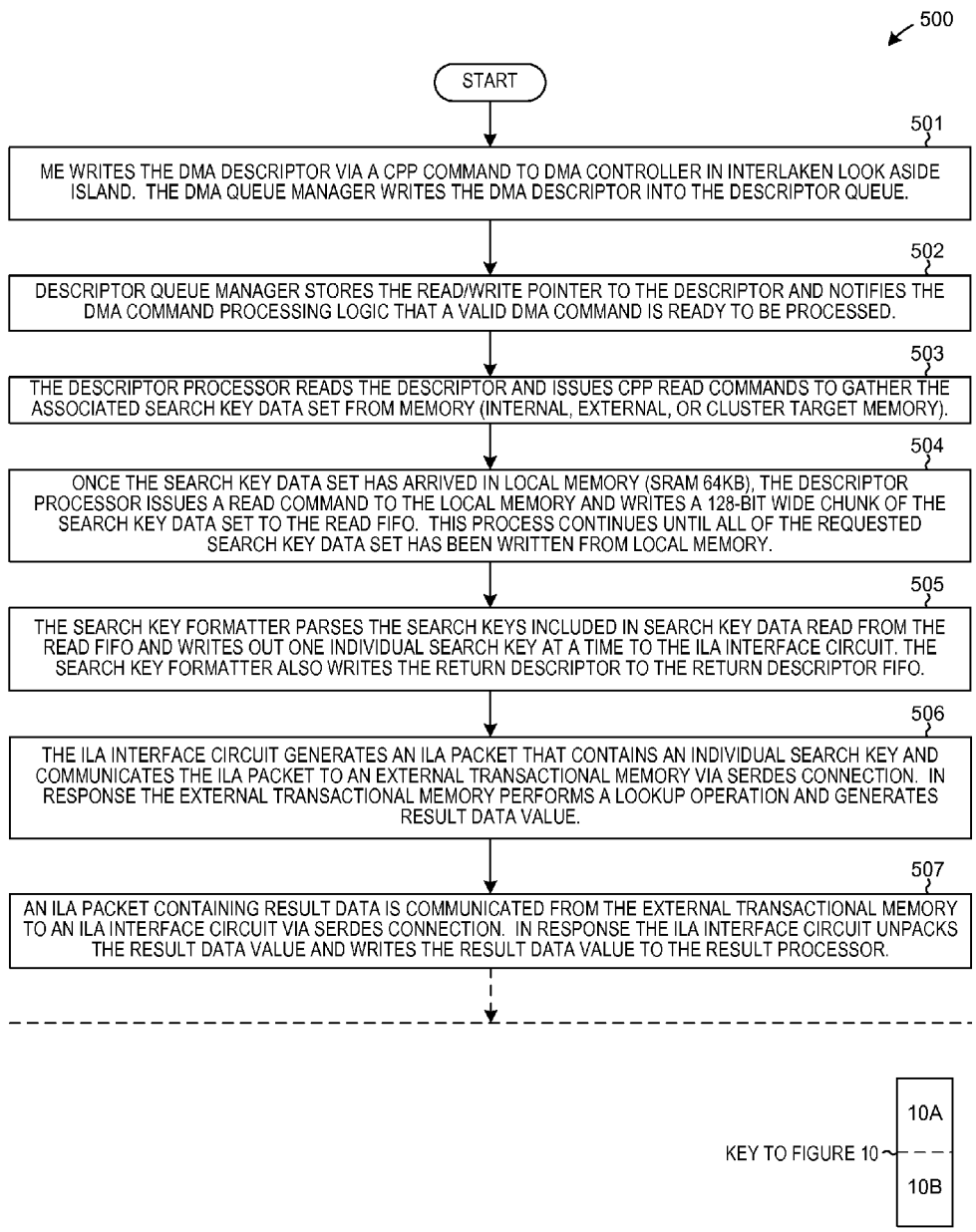
FIG. 10A is a diagram of a part of larger diagram 10 that illustrates the method of communicating multiple search keys via Direct Memory Access (DMA).
Figure 10B:
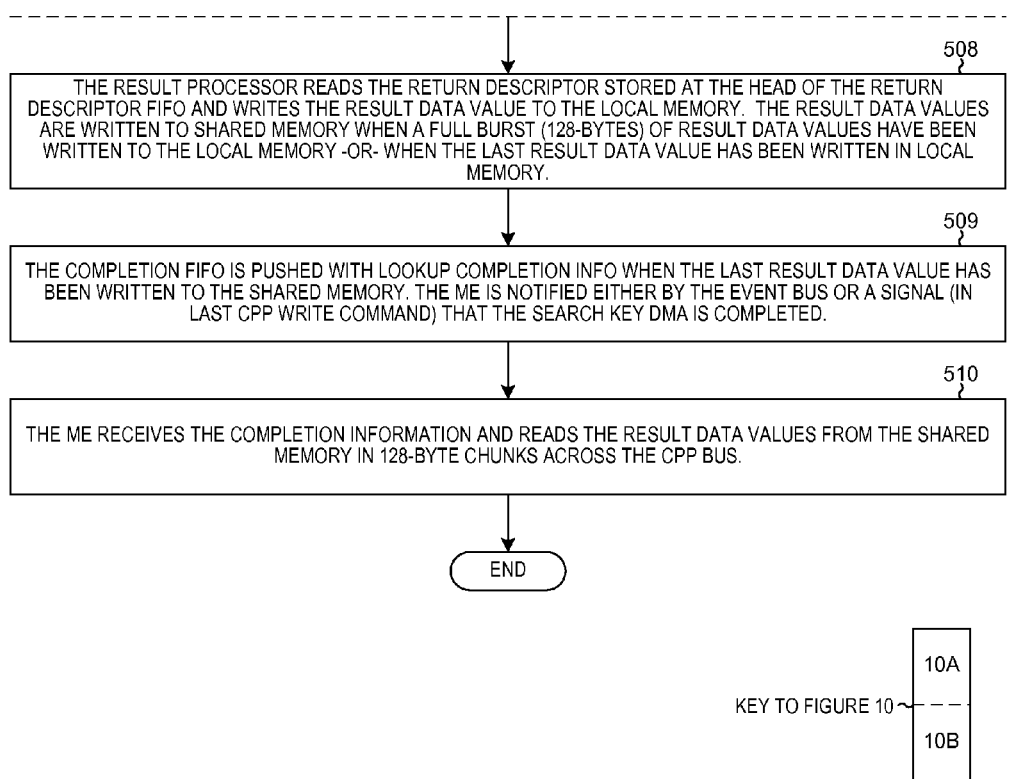
FIG. 10B is a diagram of a part of larger diagram 10 that illustrates the method of communicating multiple search keys via Direct Memory Access (DMA).

FIG. 10A and FIG. 10B are diagrams that when combined together form larger diagram 10 that illustrates the method 500 of communicating multiple search keys via Direct Memory Access (DMA). In step 501, a microengine (ME) writes a DMA descriptor via a CPP command to DMA controller in Interlaken look aside island. The DMA queue manager writes the DMA descriptor into the descriptor queue. In step 502, the descriptor queue manager stores the read/write pointer to the descriptor and notifies the DMA command processing logic that a valid DMA command is ready to be processed. In step 503, The descriptor processor reads the descriptor and issues CPP read commands to gather the associated search key data set from memory (internal, external, or cluster target memory). In step 504, once the search key data set has arrived in local memory (SRAM 64 kb), the descriptor processor issues a read command to the local memory and writes the 128-bit wide chunk of the search key data set to the read FIFO. This process continues until all of the requested search key data has been written from local memory. In step 505, the search key formatter parses the search keys included in search key data read from the read FIFO and writes out one individual search key at a time to the ILA interface circuit. The search key formatter also writes the return descriptor to the return descriptor FIFO. In step 506, The ILA interface circuit generates an ILA packet that contains an individual search key and communicates an ILA packet to an external transactional memory via SERDES connection. In response the external transactional memory performs a lookup operation and generates result data value. In step 507, an ILA packet containing result data value is communicated from the external transactional memory to an ILA interface circuit via SERDES connection. In response the ILA interface circuit unpacks the result data value and writes the result data value to the result processor. In step 508, the result processor reads the return descriptor stored at the head of the return descriptor FIFO and writes the result data value to the local memory. The result data values are written to shared memory when a full burst (128-bytes) of result data values have been written to the local memory—or—when the last result data value has been written to the local memory. In step 509, the completion FIFO is pushed with lookup completion info when the last result data value has been written to the shared memory. The ME is notified either by the event bus or a signal (in last CPP write command) that the search key DMA is completed. In step 510, the ME receives the completion information and reads the result data values from the shared memory in 128-byte chunks across the CPP bus.

Figure 14:
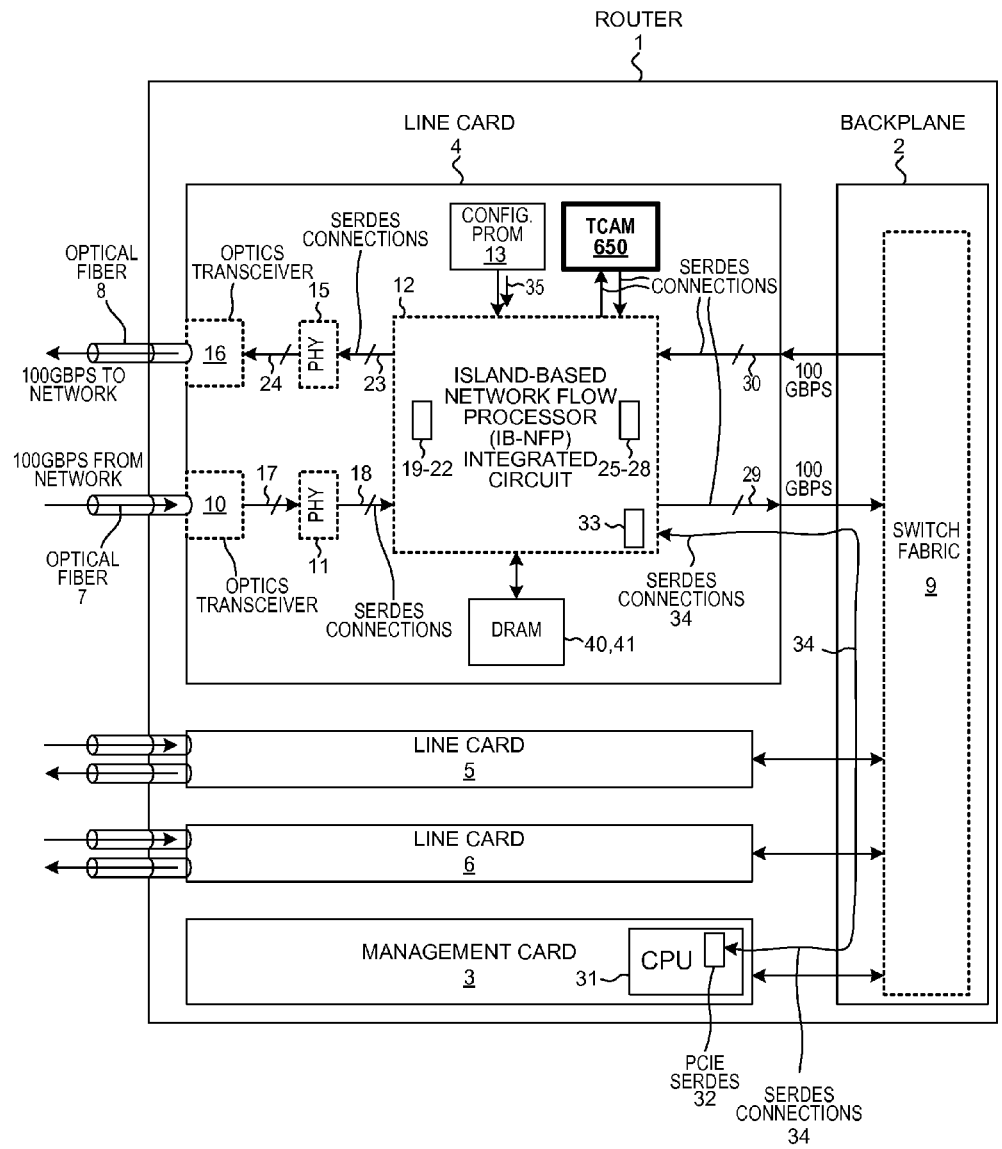
FIG. 14 is a diagram of an MPLS (MultiProtocol Label Switching) router.

FIG. 14 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external transactional memory device such as a Ternary Content Addressable Memory (TCAM) 650, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12.

External PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 15:
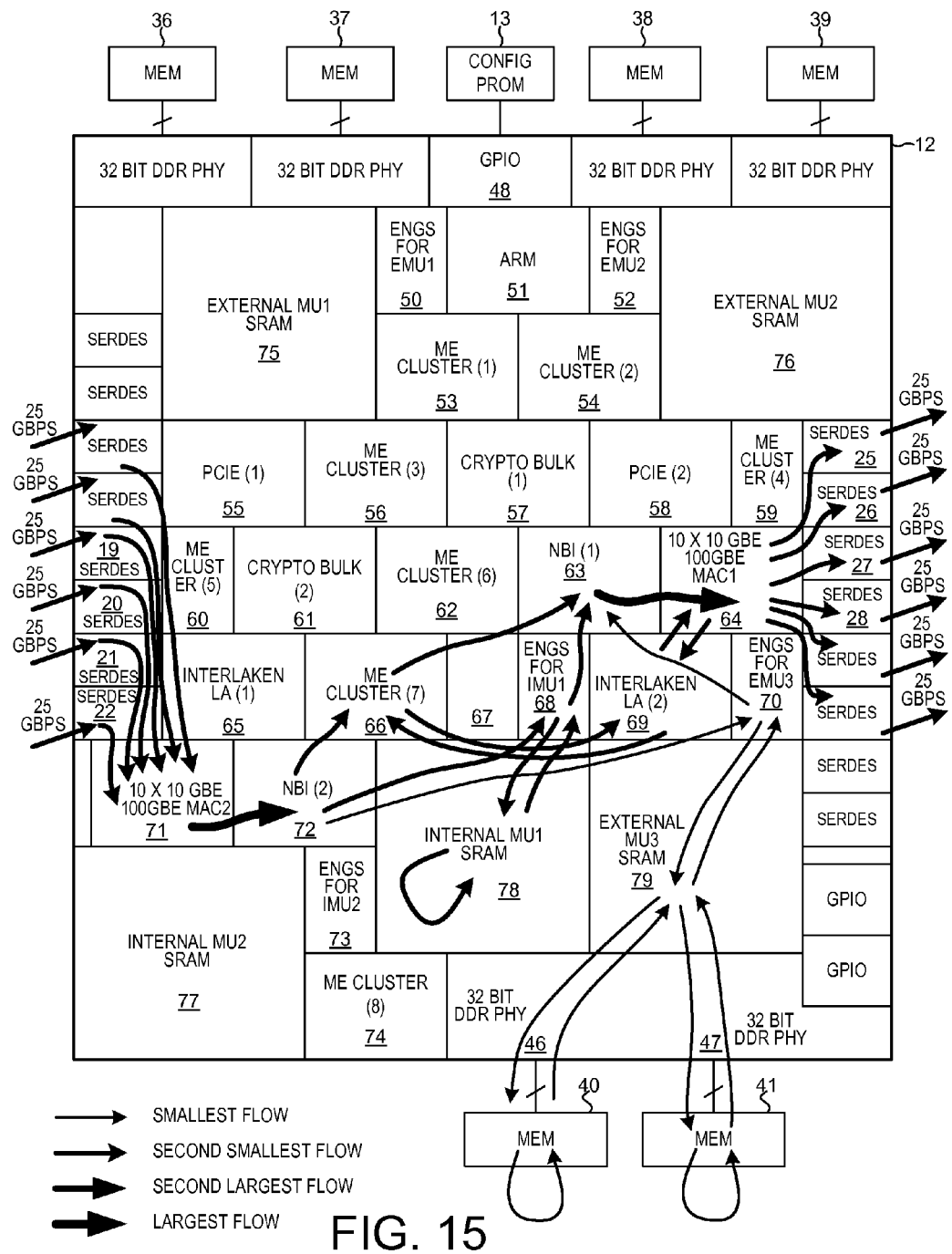
FIG. 15 is a diagram an Island-Based Network Flow Processor (IBNFP) illustrating how packets are routed.

FIG. 15 is a schematic diagram that illustrates an operational example of IB-NFP integrated circuit 12 within the MPLS router 1 of FIG. 14. 100 Gbps packet traffic is received via optical cable 7 (see FIG. 14), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 14. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface)

island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

Figure 16:
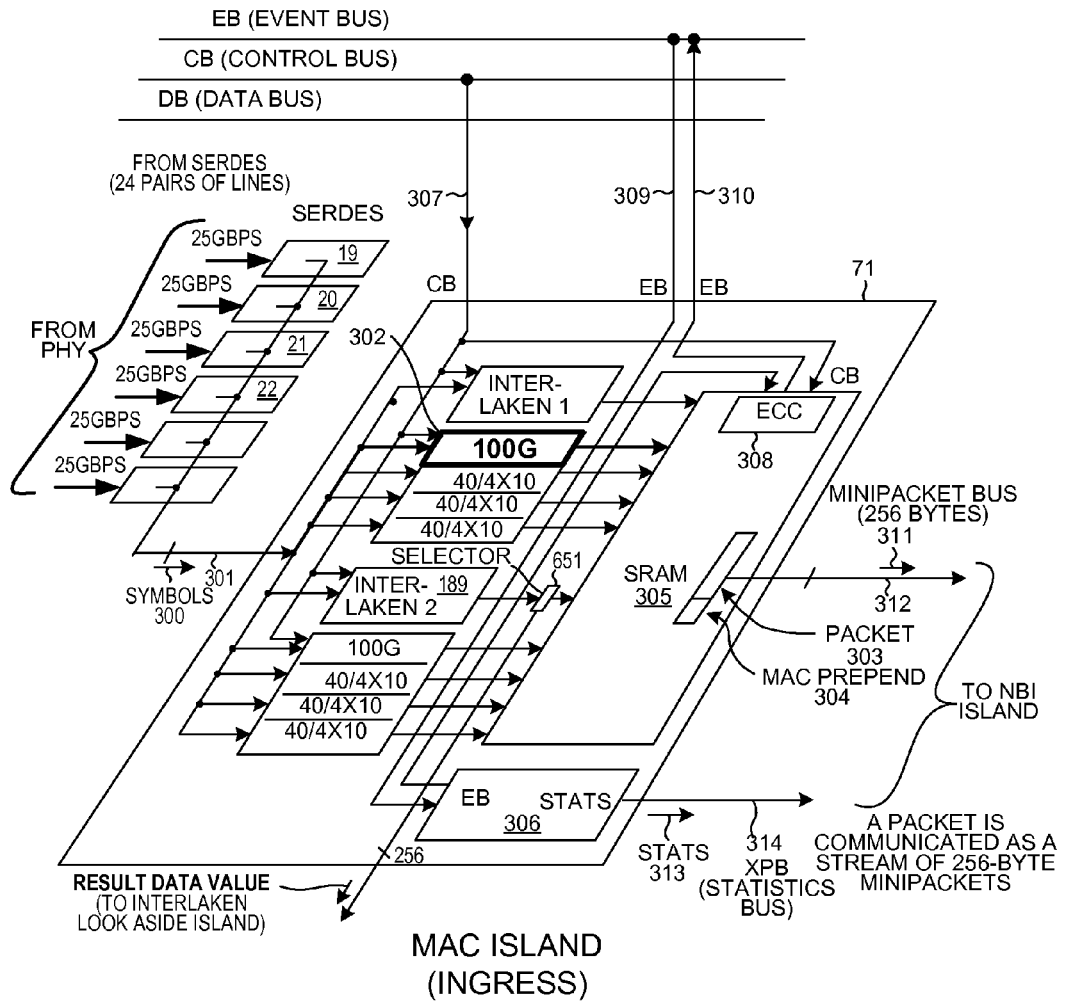
FIG. 16 is a diagram of an ingress MAC island.
Figure 17:
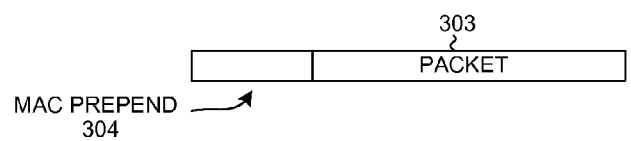
FIG. 17 is a diagram of a minipacket bus.
Figure 20:
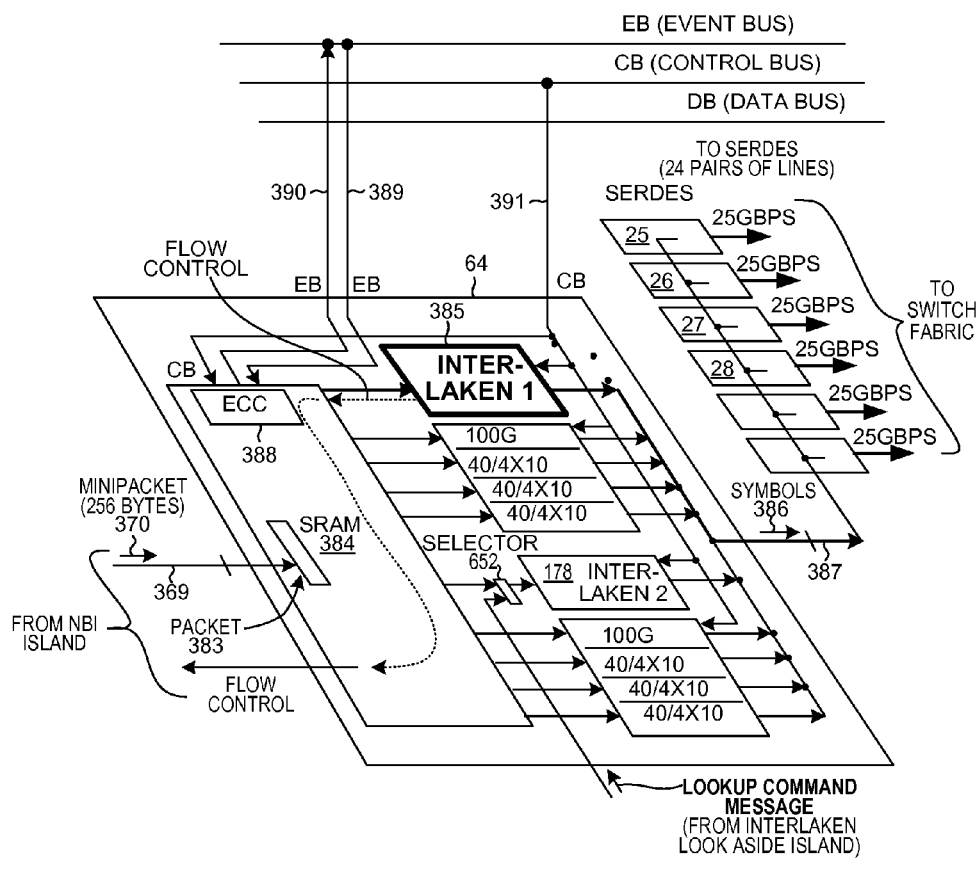
FIG. 20 is a diagram of an egress MAC island.

In the operational example of FIG. 15, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines if it is necessary to perform a lookup operation on an external content addressable memory device (e.g. TCAM 650). If ME island 66 determines that the lookup operation is necessary, ME island 66 causes a search key data set to be written into the cluster target memory 333 located in ME island 66. The ME island 66 is illustrated in greater detail in FIG. 18. Once the search key data set is stored in cluster target memory 333, the ME island generates a descriptor that is communicated across the CPP bus to Interlaken Look-Aside (ILA) island 69. The ILA island 69 is illustrated in greater detail in FIG. 19. Within the ILA island 69 the descriptor is communicated to DMA controller 170 located in Interlaken look-aside block 438. In response to receiving the descriptor the DMA controller 170 causes the search key data set stored in CTM 333 to be written to local memory associated with DMA controller 170. The DMA controller 170 separates each of the search keys included in the search key data set and generates a lookup command message for each search key. Each lookup command message is communicated to ILA interface circuit 178 (located in MAC egress island 64). The MAC egress island 64 is illustrated in greater detail in FIG. 20. ILA interface circuit 178 uses the lookup command message to generate an ILA packet that is communicated to an external content addressable device (e.g. TCAM 650) via an output SERDES port. In response to receiving the ILA packet, the external content addressable device generates an ILA packet including a result data value. The ILA packet is communicated to ILA interface circuit 189 (located in MAC ingress island 71) via an input SERDES port. The MAC ingress island 71 is illustrated in greater detail in FIG. 16. ILA interface circuit 189 unpacks the ILA packet and communicates the result data value to the DMA controller 170 located in ILA island 69. The DMA controller 170 stores the result data value in the local memory associated with DMA controller 170. The DMA controller continues this process until the final result data value associated with the descriptor has been received by the DMA controller 170. The DMA controller 170 writes the received result data values stored in local memory to the CTM 333 in 128-byte chunks. Once all the result data values associated with the descriptor are written to CTM 333, the DMA controller 170 communicates DMA completion information to the ME island 66. The DMA completion information may be written across the CPP bus or communicated via an event packet communicated along an event ring bus. Within ME island 66 the DMA completion information is communicated to the ME that generated the descriptor. In response to receiving the DMA completion information, the ME can quickly read the result data values from CTM 333 located on ME island 66 without utilizing the CPP bus.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) writing a first search key data set and a second search key data set into a memory, wherein the memory is written with search key data sets only on a word by word basis, wherein each of the first and second search key data sets includes a header along with a string of search keys, wherein the header of a search key data set indicates a common lookup operation to be performed using each of the search keys of the search key data set, wherein the header of a search key data set is immediately followed in memory by a search key of the search key data set, wherein the search keys of the search key data set are located contiguously in the memory, and wherein at least one word contains search keys from both the first and second search key data sets;
   (b) reading the memory word by word and thereby reading the first search key data set and the second search key data set;
   (c) outputting a first plurality of lookup command messages, wherein each respective one of the first plurality of lookup command messages includes a corresponding respective one of the search keys of the first search key data set; and
   (d) outputting a second plurality of lookup command messages, wherein each respective one of the second plurality of lookup command messages includes a corresponding respective one of the search keys of the second search key data set.

2. The method of claim 1, wherein the first plurality of lookup command messages are output in (c) to a transactional memory device, and wherein the second plurality of lookup command messages are output in (d) to the transactional memory device.

3. The method of claim 1, further comprising:
   (e) storing a result data value in a transactional memory device, and wherein the transactional memory device:
   1) receives a search key as part of a lookup command message, 2) uses a search key of the lookup command message to identify the result data value; and 3) outputs the result data value.

4. The method of claim 3, further comprising:
   (f) receiving a first plurality of result data values from the transactional memory device, wherein the plurality of result data values are output by the transactional memory device in response to receiving the first plurality of lookup command messages;
   (g) writing the first plurality of result data values to the memory;

(h) generating a DMA completion message; and (i) writing the DMA completion message to a processor.

5. The method of claim 4, wherein the transactional memory device is a Ternary Content Addressable Memory (TCAM), and wherein the descriptor is generated by the processor in response to an Internet Protocol (IP) lookup instruction.

6. The method of claim 4, wherein the writing of (g) is perform after n-bits of result data values are received, wherein a bus used to perform the writing of (g) is n-bits wide, and wherein all of the plurality of result data values are written in a single bus transaction.

7. The method of claim 1, wherein the header includes an indication of a number of search keys in the search key data set.

8. The method of claim 1, further comprising:
(c1) parsing a key size from a header data; and
(c2) delineating a plurality of search keys included in the search key data according to the key size.

9. The method of claim 1, wherein the reading of (b) occurs in response to a processor writing a descriptor to a Direct Memory Access (DMA) controller, wherein the DMA controller executes the read of the first and second search key data sets.

10. The method of claim 9, wherein the descriptor includes: 1) a length of a DMA operation, 2) a read address where a search key data set is stored in the memory, 3) a write address where a result data value will be written, and 4) completion notification information.

11. The method of claim 10, further comprising:
(j) reading one or more result data values from the memory, wherein the reading of (j) is performed by the processor across a bus.

12. The method of claim 1, wherein the reading of (b) is performed using n-bits per bus transaction, and wherein a bus used to perform the reading of (b) is n-bits wide.

13. The method of claim 1, wherein steps (a) through (d) are performed only utilizing combinatory logic.

* * * * *